(12) United States Patent   (10) Patent No.: US 12,429,714 B2
Saylor et al.                    (45) Date of Patent:    Sep. 30, 2025

(54) HIGH TRANSMITTANCE EYEWEAR WITH CHROMA ENHANCEMENT

(71) Applicant: Oakley, Inc., Foothill Ranch, CA (US)

(72) Inventors: Ryan Saylor, Mission Viejo, CA (US); Brock Scott McCabe, Laguna Niguel, CA (US)

(73) Assignee: Oakley, Inc., Foothill Ranch, CA (US)

( * ) Notice: Subject to any disclaimer, the term of this patent is extended or adjusted under 35 U.S.C. 154(b) by 363 days.

(21) Appl. No.: 17/104,439

(22) Filed: Nov. 25, 2020

(65) Prior Publication Data

US 2021/0157170 A1    May 27, 2021

Related U.S. Application Data

(60) Provisional application No. 62/940,724, filed on Nov. 26, 2019.

(51) Int. Cl.
   *G02C 7/10*    (2006.01)
   *G02C 7/02*    (2006.01)

(52) U.S. Cl.
   CPC ............. *G02C 7/104* (2013.01); *G02C 7/102* (2013.01); *G02C 7/028* (2013.01)

(58) Field of Classification Search
   CPC ....................................................... G02C 7/104
   USPC ............................ 351/159.6, 159.65, 159.62
   See application file for complete search history.

(56) References Cited

U.S. PATENT DOCUMENTS

| | | |
|---|---|---|
| 4,793,669 A | 12/1988 | Perilloux |
| 4,952,046 A | 8/1990 | Stephens et al. |
| 5,083,858 A * | 1/1992 | Girerd .................... G02C 7/104 351/44 |
| 5,190,896 A | 3/1993 | Pucilowski et al. |
| 5,446,007 A | 8/1995 | Krashkevich et al. |
| 5,592,245 A | 1/1997 | Moore et al. |

(Continued)

FOREIGN PATENT DOCUMENTS

| | | |
|---|---|---|
| CN | 106646917 A | 5/2017 |
| EP | 2030075 B1 | 1/2017 |

(Continued)

OTHER PUBLICATIONS

"Amazon.com: TrueDark Daywalker Elite Blue Light Blocking Glasses, https://www.amazon.com/TrueDark-Daywalker-Elite-Filtering-Glasses/dp/B07262NGHN/ref=sr_1_1?crid=22K9BNW6IOCGT&keywords=daywalker+glasses&qid=1569544279&sprefix=daywalker%2Caps%2C165&sr=8-1, downloaded Oct. 10, 2019; 9 pages."

(Continued)

*Primary Examiner* — Zachary W Wilkes
(74) *Attorney, Agent, or Firm* — Sterne, Kessler, Goldstein &Fox P.L.L.C.

(57)    ABSTRACT

The present disclosure relates to a high transmittance eyewear. The high transmittance eyewear can include a lens with a chroma enhancement filter. The lens can have a front surface and a rear surface. The high transmittance eyewear can further include a transmittance enhancement layer disposed over the front surface of the lens. The high transmittance eyewear that includes the transmittance enhancement layer and the chroma enhancement filter can provide a high optical transparency (e.g., a high optical transmittance) for the wearer for an indoor or a driving use while maintaining a chroma enhancement capability provided by the chroma enhancement filter.

19 Claims, 15 Drawing Sheets

(56) References Cited

U.S. PATENT DOCUMENTS

| | | | |
|---|---|---|---|
| 5,922,246 A | 7/1999 | Matsushita et al. | |
| 6,132,044 A | 10/2000 | Sternbergh | |
| 6,135,595 A | 10/2000 | Takeshita et al. | |
| 6,138,286 A | 10/2000 | Robrahn et al. | |
| 6,145,984 A | 11/2000 | Farwig | |
| 6,231,183 B1 | 5/2001 | Dillon | |
| 6,334,680 B1 | 1/2002 | Larson | |
| 6,604,824 B2 | 8/2003 | Larson | |
| 6,615,409 B2 | 9/2003 | Youmans et al. | |
| 6,623,116 B2 | 9/2003 | Kerns, Jr. et al. | |
| 6,631,987 B2 | 10/2003 | Reichow et al. | |
| 6,641,261 B2 | 11/2003 | Wang et al. | |
| 6,773,816 B2 | 8/2004 | Tsutsumi | |
| 6,811,258 B1 | 11/2004 | Grant | |
| 6,811,727 B2 | 11/2004 | Havens et al. | |
| 6,853,471 B2 | 2/2005 | Sommer et al. | |
| 6,863,397 B2 | 3/2005 | Nakano | |
| 6,926,405 B2 | 8/2005 | Ambler et al. | |
| 6,955,430 B2 | 10/2005 | Pratt | |
| 6,984,038 B2 | 1/2006 | Ishak | |
| 7,029,118 B2 | 4/2006 | Ishak | |
| 7,106,509 B2 | 9/2006 | Sharp | |
| 7,278,737 B2 | 10/2007 | Mainster et al. | |
| 7,520,608 B2 | 4/2009 | Ishak et al. | |
| 7,556,376 B2 | 7/2009 | Ishak et al. | |
| 7,755,762 B2 | 7/2010 | Baillet et al. | |
| 7,976,157 B2 | 7/2011 | Croft et al. | |
| 8,360,574 B2 | 1/2013 | Ishak et al. | |
| 8,403,478 B2 | 3/2013 | Ishak | |
| 8,469,512 B2 | 6/2013 | Croft et al. | |
| 8,500,274 B2 | 8/2013 | Ishak | |
| 8,770,749 B2 * | 7/2014 | McCabe | G02B 5/223 |
| | | | 351/159.6 |
| 8,882,267 B2 | 11/2014 | Ishak et al. | |
| 8,908,275 B2 | 12/2014 | Fukagawa et al. | |
| 8,911,082 B2 * | 12/2014 | Ambler | G02C 7/104 |
| | | | 351/159.65 |
| 9,134,547 B2 * | 9/2015 | McCabe | B29C 45/14778 |
| 9,169,373 B2 | 10/2015 | Chiu et al. | |
| 9,377,564 B2 | 6/2016 | Su et al. | |
| 9,377,569 B2 | 6/2016 | Ishak et al. | |
| 9,383,594 B2 * | 7/2016 | McCabe | G02B 5/223 |
| 9,389,435 B2 | 7/2016 | De Ayguavives et al. | |
| 9,417,460 B2 | 8/2016 | Croft et al. | |
| 9,488,852 B2 | 11/2016 | Cado et al. | |
| 9,500,875 B2 | 11/2016 | Zalevsky et al. | |
| 9,575,335 B1 * | 2/2017 | McCabe | G02C 7/108 |
| 9,625,740 B2 | 4/2017 | Kudla et al. | |
| 9,885,885 B2 | 2/2018 | Weber et al. | |
| 9,910,297 B1 * | 3/2018 | McCabe | G02C 7/104 |
| 9,927,635 B2 | 3/2018 | Ishak et al. | |
| 9,969,135 B2 | 5/2018 | Valeri et al. | |
| 9,977,263 B2 | 5/2018 | Iordanis | |
| 10,025,117 B2 | 7/2018 | Takedomi et al. | |
| 10,162,195 B2 | 12/2018 | Marck | |
| 10,175,508 B2 | 1/2019 | Ambler et al. | |
| 10,203,524 B2 | 2/2019 | Baillet | |
| 10,234,608 B2 | 3/2019 | Blair et al. | |
| 10,281,627 B2 | 5/2019 | Blair et al. | |
| 10,295,821 B2 * | 5/2019 | McCabe | G02C 11/08 |
| 10,345,623 B2 * | 7/2019 | McCabe | B29D 11/0073 |
| 10,385,187 B2 | 8/2019 | Fei et al. | |
| 10,401,652 B2 * | 9/2019 | McCabe | G02C 7/102 |
| 10,502,980 B2 * | 12/2019 | McCabe | G02C 7/12 |
| 10,520,756 B2 * | 12/2019 | Gallina | B29D 11/00 |
| 10,545,264 B1 | 1/2020 | Haaland | |
| 10,571,716 B2 | 2/2020 | Chapiro | |
| 10,571,719 B1 * | 2/2020 | McCabe | G02C 7/104 |
| 10,591,746 B2 | 3/2020 | Macinnis | |
| 10,690,944 B2 * | 6/2020 | Ogo | G02B 1/115 |
| 10,695,887 B2 | 6/2020 | Berzon et al. | |
| 10,725,322 B2 | 7/2020 | Barrau et al. | |
| 10,768,448 B2 | 9/2020 | Shan et al. | |
| 10,845,625 B2 | 11/2020 | Carrega et al. | |
| 10,871,661 B2 * | 12/2020 | Saylor | B29D 11/0073 |
| 10,914,877 B2 | 2/2021 | Blair et al. | |
| 10,935,709 B2 | 3/2021 | Haaland | |
| 10,935,814 B2 | 3/2021 | Valentine | |
| 10,976,574 B2 * | 4/2021 | McCabe | G02B 5/223 |
| 11,009,724 B2 | 5/2021 | Shan et al. | |
| 11,029,541 B2 | 6/2021 | Chiu et al. | |
| 11,065,468 B2 | 7/2021 | Barrau et al. | |
| 11,092,541 B2 | 8/2021 | Barrau | |
| 11,099,408 B2 * | 8/2021 | McCabe | G02C 7/104 |
| 11,199,729 B2 | 12/2021 | Ding et al. | |
| 11,397,337 B2 * | 7/2022 | McCabe | G02C 7/108 |
| 11,474,382 B2 * | 10/2022 | McCabe | B29C 45/14778 |
| 2007/0258038 A1 | 11/2007 | Kobayashi et al. | |
| 2011/0255051 A1 * | 10/2011 | McCabe | G02C 7/12 |
| | | | 351/159.63 |
| 2013/0141693 A1 * | 6/2013 | McCabe | G02C 7/104 |
| | | | 351/159.56 |
| 2014/0268031 A1 * | 9/2014 | Ambler | G02C 7/104 |
| | | | 351/159.64 |
| 2014/0300857 A1 | 10/2014 | Cohen-Tannoudji et al. | |
| 2015/0022777 A1 * | 1/2015 | McCabe | G02C 7/12 |
| | | | 351/159.65 |
| 2015/0131047 A1 * | 5/2015 | Saylor | G02C 7/108 |
| | | | 351/44 |
| 2016/0048037 A1 * | 2/2016 | McCabe | B29C 45/14819 |
| | | | 351/159.66 |
| 2016/0070119 A1 * | 3/2016 | McCabe | B29C 45/14819 |
| | | | 351/159.56 |
| 2016/0124118 A1 * | 5/2016 | Takahashi | G02B 1/115 |
| | | | 359/581 |
| 2016/0154254 A1 | 6/2016 | Bolshakov et al. | |
| 2017/0068113 A1 * | 3/2017 | McCabe | G02C 7/12 |
| 2017/0075143 A1 | 3/2017 | Saylor et al. | |
| 2017/0102558 A1 * | 4/2017 | Saylor | G02B 1/11 |
| 2017/0205639 A1 * | 7/2017 | McCabe | G02C 7/108 |
| 2017/0227681 A1 | 8/2017 | Maury et al. | |
| 2017/0299887 A1 | 10/2017 | Maury et al. | |
| 2017/0299896 A1 * | 10/2017 | Ogo | G02C 7/10 |
| 2017/0299898 A1 | 10/2017 | Gallina et al. | |
| 2018/0321510 A1 * | 11/2018 | Vetro | G02C 7/104 |
| 2018/0321514 A1 | 11/2018 | Carrega et al. | |
| 2020/0018993 A1 | 1/2020 | Adachi et al. | |
| 2020/0081270 A1 * | 3/2020 | Mccabe | B29C 45/14819 |
| 2020/0081271 A1 * | 3/2020 | McCABE | G02C 7/12 |
| 2020/0218089 A1 | 7/2020 | Dubail et al. | |
| 2020/0409183 A1 * | 12/2020 | Saylor | G02C 7/104 |

FOREIGN PATENT DOCUMENTS

| | | |
|---|---|---|
| EP | 3112910 A1 | 1/2017 |
| EP | 3112926 A1 | 1/2017 |
| EP | 3296352 A1 | 3/2018 |
| EP | 3150364 B1 | 11/2018 |
| EP | 3364236 A1 | 8/2019 |
| EP | 3399354 B1 | 5/2020 |
| EP | 3027397 B1 | 7/2021 |
| JP | 2634159 B2 | 7/1997 |
| KR | 100430024 B1 | 5/2004 |
| WO | WO 88/02871 A1 | 4/1988 |
| WO | WO 2008/024414 A2 | 2/2008 |
| WO | WO 2008/067109 A1 | 6/2008 |
| WO | WO 2014/159115 A1 | 10/2014 |
| WO | WO 2016/077431 A2 | 5/2016 |
| WO | WO 2017/077359 A1 | 5/2017 |
| WO | WO 2019/012304 A1 | 1/2019 |
| WO | WO 2019/057730 A1 | 3/2019 |
| WO | WO 2019/057751 A1 | 3/2019 |
| WO | WO 2019/119101 A1 | 6/2019 |
| WO | WO 2019/121303 A1 | 6/2019 |
| WO | WO 2019/228989 A1 | 12/2019 |
| WO | WO 2019/238648 A1 | 12/2019 |

(56) References Cited

FOREIGN PATENT DOCUMENTS

| WO | WO 2020/064963 A1 | 4/2020 |
|----|-------------------|--------|
| WO | WO 2020/187799 A1 | 9/2020 |

OTHER PUBLICATIONS

"ANSI Z80.3-2009: American National Standard for Opthalmics—Nonprescription Sunglass and Fashion Eyewear Requirements," Sep. 2, 2009, pp. 1-25.

"ANSI Z80.3-2018: American National Standard for Ophthalmics—Nonprescription Sunglass and Fashion Eyewear Requirements," Mar. 13, 2018, pp. 1-40.

"Anonymous,"Anti-reflective coating,"Feb. 6, 2009, pp. 1-6, XP002631224, Retrieved from: http://replay.waybackmachine.org/20090206235736/ http://en.wikipedia.org/wiki/Anti-reflective_coating (retrieved Mar. 30, 2011)."

Choudhury et al., "Color Contrast Enhancement for Visually Impaired People," IEEE (2010), pp. 33-40.

Circadian Eyewear, https://circadianeyewear.com, downloaded Oct. 10, 2019; 7 pages.

Extended European Search Report issued in related European Patent Application No. 20209840.6, mailed Apr. 21, 2021; 9 pages.

Hughes, "Dispensing Tinted Spectacles," Optometry Today (Jul. 25, 2015); 6 pages.

"Insight on Color: Yellowness Indices," Applications Note, vol. 8, No. 15, HunterLab (2008); 2 pages.

ISO 12311:2013(E): "Personal protective equipment—Test methods for sunglasses and related eyewear," Aug. 1, 2013; 92 pages.

Lens Technology—Pixel Eyewear, https://www.pixeleyewear.com/pages/lens-technology, downloaded Oct. 10, 2019; 3 pages.

Lingelbach et al., "Contrast Enhancing Filters in Ski Sports," Journal of ASTM International, vol. 2, No. 1 (Jan. 2005), pp. 1-8.

Migraine Relief—Fluorescent Light Glasses for Migraines—TheraSpecs, https://www.theraspecs.com, downloaded Oct. 10, 2019; 7 pages.

Pyzer, "The Use of Selective Contrast Colour Filters for Eye Disease," Optician (Aug. 18, 2005); 11 pages.

\* cited by examiner

HIGH TRANSMITTANCE EYEWEAR WITH CHROMA ENHANCEMENT

RELATED APPLICATION

This application claims the benefit of U.S. Provisional Patent Application No. 62/940,724, filed on Nov. 26, 2019, titled "High Transmittance Eyewear with Chroma Enhancement," which is incorporated by reference herein in its entirety.

BACKGROUND

Objects that humans can visually observe in the environment typically emit, reflect, or transmit visible light from one or more surfaces. The surfaces can be considered an array of points that the human eye is unable to resolve any more finely. Each point on a surface typically does not emit, reflect, or transmit a single wavelength of light; rather, it emits, reflects, or transmits a broad spectrum of wavelengths that are interpreted as a single color in human vision. Generally speaking, if one were to observe the corresponding "single wavelength" of light for that interpreted color (for example, a visual stimulus having a very narrow spectral bandwidth, such as 1 nm), it would appear extremely vivid when compared to a color interpreted from a broad spectrum of observed wavelengths.

An eyewear can incorporate an optical filter configured to substantially remove outer bands of a broad visual stimulus to make colors appear more vivid as perceived in human vision. The outer bands of a broad visual stimulus refer to wavelengths that, when substantially, nearly completely, or completely attenuated, decrease the bandwidth of the stimulus such that the vividness of the perceived color is increased. Such eyewear can be configured to substantially increase the colorfulness, clarity, and/or vividness of a scene ("chroma enhancement"). But depending on its strength and implementation, such chroma enhancement can result in an low optical transmittance of the overall eyewear, thus making the eyewear unsuitable for indoor or driving use.

SUMMARY

To address the above-noted challenge, embodiments of the present disclosure are directed to an eyewear that provides a chroma enhancement along with a high optical transmittance, and a method of forming the same. The eyewear can be made of a substantially clear lens (also referred to as "high transmittance lens") that provides both the chroma enhancement (e.g., a high vividness seen through the eyewear) and a high optical transmittance (e.g., a high optical transparency seen through the eyewear) across the visible spectral range. For example, the high transmittance lens can include an optical filter configured to provide the chroma enhancement. The high transmittance lens can further include a transmittance enhancement layer (e.g., an index-matching layer and/or an anti-reflection coating layer) formed over a front side and/or a rear-side of the optical filter. The transmittance enhancement layer can enhance the optical transparency seen through the overall eyewear (e.g., seen through the stack of transmittance enhancement layer and the optical filter), as compared to a lens without the transmittance enhancement layer. Accordingly, the overall eyewear (including the transmittance enhancement layer and the optical filter) can provide a high optical transparency (e.g., a high optical transmittance) for the wearer while maintaining a chroma enhancement capability provided by the optical filter. A benefit of embodiments of the present disclosure is to effectively provide an eyewear having both characteristics of chroma enhancement and high optical transmittance, thus suitable for an indoor or a driving use. Further, embodiments of the present disclosure can increase design margins to further integrate additional functional layers, such as a photochromic layer and/or a polarizing layer, in the eyewear to provide extra functionality for the wearer without losing the high optical transparency of the eyewear.

BRIEF DESCRIPTION OF THE DRAWINGS

Aspects of this disclosure are best understood from the following detailed description when read with the accompanying figures. It is noted that, in accordance with the common practice in the industry, various features are not drawn to scale. In fact, the dimensions of the various features may be arbitrarily increased or reduced for clarity of discussion.

Illustrative embodiments will now be described with reference to the accompanying drawings. In the drawings, like reference numerals generally indicate identical, functionally similar, and/or structurally similar elements.

DETAILED DESCRIPTION

Figure 1:
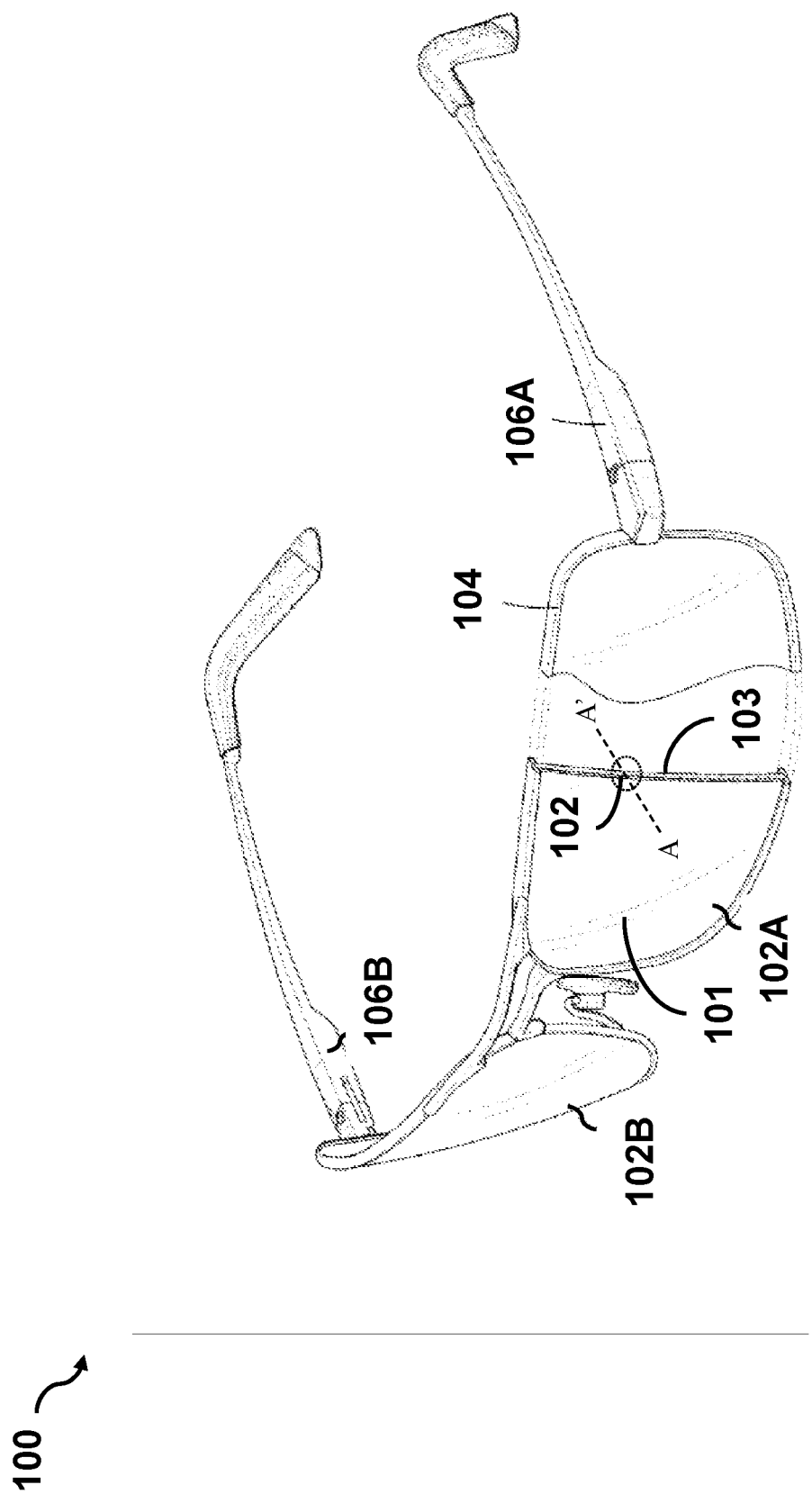
FIG. 1 illustrates a perspective view of an eyewear configured to provide a chroma enhancement, according to some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. As used herein, the formation of a first feature on a second feature means the first feature is formed in direct contact with the second feature. In addition, the present disclosure may repeat reference numerals and/or letters in the various examples. This repetition does not in itself dictate a relationship between the various embodiments and/or configurations discussed.

Spatially relative terms, such as "beneath," "underlying," "underneath," "below," "lower," "above," "upper," "lower," and the like may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly.

It is noted that references in the specification to "one embodiment," "an embodiment," "an example embodiment," "exemplary," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

It is to be understood that the phraseology or terminology herein is for the purpose of description and not of limitation, such that the terminology or phraseology of the present specification is to be interpreted by those skilled in relevant art(s) in light of the teachings herein.

In some embodiments, the terms "about" and "substantially" can indicate a value of a given quantity that varies within 5% of the value (e.g., ±1%, ±2%, ±3%, ±4%, or ±5% of the value).

As used herein, the term "between a first value and a second value," as used for example in "a wavelength range is between 440 nm and 520 nm," means that the wavelength range is from 440 nm to 520 nm, where end points of 440 nm and 520 nm are both included in the wavelength range.

As used herein, the term "visible spectral range" refers to a wavelength range from about 380 nm to about 780 nm.

As used herein, the term "across a spectral range" refers to all wavelengths (e.g., with an increment of 1 nm) within the spectral range.

As used herein, the terms "over a spectral range" and "in a spectral range" refer to at least one wavelength within the spectral range.

As used herein, the term "optical transmittance" refers to the fraction of incident electromagnetic power transmitted through an object.

As used herein, the term "visible light transmittance (VLT)" refers to a luminous transmittance profile, such as using Commission Internationale de l'Elcairage (CIE) standard illuminant D65, ISO 12331, or ANSI® Z80.3.

As used herein, the term "chroma enhancement filter" refers to a chroma enhancement material, a chroma enhancement dye, a chroma enhancement doping, a chroma enhancement coating, a chroma enhancement film, a chroma enhancement layer, a chroma enhancement wafer, or a chroma enhancement lens body that can provide chroma enhancement to increase the vividness of the perceived colors.

As used herein, the term "horizontal" refers to a direction along (i.e., in the plane) or substantially parallel to a surface of an eyewear's lens.

As used herein, the term "vertical" refers to a direction substantially perpendicular to the horizontal direction (i.e., perpendicular to the plane defined by an eyewear's lens's surface).

As used herein, the term "disposed," as used for example in "a first layer is disposed over a second layer," means that the first layer is directly placed against the second layer's surface, or that the first layer is indirectly placed over the second layer's surface with at least a third layer in between.

As used herein, the term "coupled," as used for example in "a first layer is coupled to a second layer" means that the first layer is disposed over the second layer (as "disposed" is defined above), or that the first layer is integrated into the second layer.

In some embodiments, an eyewear can be configured to provide a chroma enhancement along with a high optical transmittance. In some embodiments, the eyewear can include a substantially clear lens (also referred to as "high transmittance lens") that provides the chroma enhancement. In some embodiments, this high transmittance lens can be a substantially colorless lens. A benefit of embodiments of the present disclosure is to effectively provide an eyewear having both characteristics of chroma enhancement and high optical transmittance, thus suitable for an indoor or a driving use. In addition, the high optical transmittance characteristics can increase design margins for the eyewear to further integrate additional utility layers, such as a photochromic layer and/or a polarizing layer, with the high transmittance lens to provide extra functionality for the eyewear.

The high transmittance lens can include an optical filter having a first optical transmittance and chroma enhancement properties (i.e., the optical filter can include a chroma enhancement filter configured to provide the chroma enhancement properties). The high transmittance lens can further include a high transmittance layer, such as an anti-reflection layer and/or an index-matching layer, disposed forward and/or rearward of the optical filter. By incorporating the high transmittance layer with the optical filter, the chroma enhancement properties of the overall high transmittance lens can be maintained while also maintaining a high optical transmittance as would exist in a neutral lens counterpart of the high transmittance lens (i.e., same optical transmittance, increased chroma). In some embodiments, the overall optical transmittance of the high transmittance lens can be increased as compared to the chroma enhancement filter without the high transmittance layer, while maintaining substantially the same chroma enhancement (i.e., same chroma, increased transmittance). In some embodiments, the above-noted "same chroma, increased transmittance" property can be archived by a high transmittance layer that can uniformly increase the transmittance across the visible spectrum, while the chroma enhancement filter can selectively decrease transmission (attenuate) at specific wavelengths.

In some embodiments, the optical filter with chroma enhancement properties can be a chroma enhancement lens. In some embodiments, the chroma enhancement lens can include a lens body and a chroma enhancement filter. The high transmittance lens can then include the high transmittance layer coupled to the chroma enhancement lens. In some embodiments, the chroma enhancement filter can be bodily incorporated into the lens body, such as integrated into the lens body with a dye. In other embodiments, the chroma enhancement filter can be a layer disposed between the lens body and the high transmittance layer and on a surface of the lens body. For example, the chroma enhancement layer can be disposed on a front surface of the lens body with the high transmittance layer being disposed forward of the chroma enhancement layer, or the chroma enhancement layer can be disposed on a rear surface of the lens body with the high transmittance layer being disposed rearward of the chroma enhancement layer. In some embodiments, the high transmittance layer can include an anti-reflection layer disposed over the rear surface of the chroma enhancement lens. In some embodiments, the anti-reflection layer can be a coating or a film configured to reduce an optical reflectivity from the rear surface of the high transmittance lens.

In some embodiments, the high transmittance layer can be a transmittance enhancement layer to increase the transmittance of light through the high transmittance lens (i.e., more light passes through a lens having such a transmittance enhancement layer as compared to an equivalent lens without the transmittance enhancement layer). In some embodiments, the high transmittance layer can be disposed over one or both sides of the high transmittance lens. In some embodiments, the high transmittance layer can form the front surface of the high transmittance lens and/or the rear surface of the high transmittance lens.

In some embodiments, the transmittance enhancement layer can include an index-matching layer configured to reconcile a refractive index difference between the high transmittance lens and a working environment (e.g., air) of the eyewear. In some embodiments, the index-matching layer can be disposed on a front side of the lens.

In some embodiments, the transmittance enhancement layer can include an anti-reflection coating configured to decrease the reflection of light away from the high transmittance lens. In some embodiments, the anti-reflection coating layer can be disposed on a rear surface of the lens such that it reduces an optical reflectivity across the visible spectral range from the eyewear back to the user's eyes. In some embodiments, a first transmittance enhancement layer can be disposed towards the front of the lens, and a second transmittance enhancement layer can be disposed towards the rear of the lens. In some embodiments, the high transmittance lens can include an anti-reflection coating on both the front and rear of the lens. In some embodiments, the high transmittance lens can include an index matching layer disposed towards the front of the lens, and an anti-reflective coating disposed towards the rear of the lens. When used on a lens having a chroma enhancement filter, the transmittance enhancement layer(s) increase the transmittance of the lens as compared to an equivalent lens without the transmittance enhancement layer(s), and maintain the transmittance of the lens as compared to an equivalent lens without the chroma enhancement filter.

FIG. 1 illustrates a perspective view of an eyewear 100 configured to provide a chroma enhancement, according to some embodiments. Eyewear 100 can include a lens 102A, a lens 102B, a mounting frame 104 configured to support the lenses 102A and 102B, and ear stems 106A and 106B attached to mounting frame 104. Eyewear 100 can be of any type, including general-purpose eyewear, special-purpose eyewear, sunglasses, driving glasses, sporting glasses, goggles, indoor eyewear, outdoor eyewear, eyewear incorporated into headgear (such as visors for helmets), vision-correcting eyewear, contrast-enhancing eyewear, chroma-enhancing eyewear, color-enhancing eyewear, color-altering eyewear, eyewear designed for another purpose, or eyewear designed for a combination of purposes. In some embodiments, lenses and frames of many other shapes and configurations may be used for eyewear 100. For example, eyewear 100 can have a single lens, such as in a goggle or visor. It should be noted that eyewear 100 shown in FIG. 1 is not drawn to scale but is drawn to more easily illustrate certain aspects of eyewear 100.

Lenses 102A and 102B are each high transmittance lenses (that is, having low overall optical density). Lenses 102A and 102B can be non-corrective or corrective for vision. In some embodiments, lenses 102A and 102B can be configured to provide vision correction for a wearer of eyewear 100, and can have optical power. Such lenses can be configured to correct for near-sighted or far-sighted vision or astigmatism. In other embodiments, lenses 102A and 102B are non-corrective, such as a plano lens that does not provide optical power for vision correction.

Lenses 102A and 102B are also referred to herein as optical filters 102. Each optical filter 102 has a front surface 101 and a rear surface 103. In some embodiments, front surface 101 and/or rear surface 103 can be a hydrophobic surface. Optical filter 102 can be configured to provide any desired lens chromaticity, a chroma-enhancing effect, a photochromic effect, an electrochromic effect, an optical polarizing effect, or any combination thereof. In some embodiments, optical filter 102 can be configured to provide a substantially neutral visible light spectral profile as seen through optical filter 102. For example, an overall color appearance of optical filter 102 can be substantially color neutral and substantially transparent. In some embodiments, the overall color appearance of optical filter 102 has a transmitted color $([(a^*)^2+(b^*)^2]^{1/2})$ less than about 15, less than about 12, less than about 9, less than about 6, or less than about 3 in CIE L*a*b* color space coordinates. In some embodiments, the overall color appearance of optical filter 102 has a yellowness index YI E313 less than about 23, less than about 17, less than about 12, less than about 7, or less than about 2. In some embodiments, yellowness index YI E313 can be determined according to the technique defined in ASTM E313-20. In some embodiments, the overall color appearance of optical filter 102 can have a CIE chromaticity x between about 0.25 and about 0.41, between about 0.28 and about 0.38, between about 0.3 and about 0.36, or between about 0.31 and about 0.35. In some embodiments, the overall color appearance of optical filter 102 can have a CIE chromaticity y between about 0.25 and about 0.41, between about 0.28 and about 0.38, between about 0.3 and about 0.36, or between about 0.31 and about 0.35. In some embodiments, the CIE chromaticity x and y can be determined using CIE illuminant D65.

Lenses 102A and 102B can be made of any of a variety of optical materials including glasses or plastics such as acrylics or polycarbonates. The lenses can have various shapes. For example, each of lenses 102A and 102B can be flat, have one axis of curvature, two axes of curvature, or more than two axes of curvature. Each of lenses 102A and 102B can be cylindrical, parabolic, spherical, toroidal, flat, or elliptical, or any other shape such as a meniscus or catenoid. In some embodiments, each of lenses 102A and 102B can have a blank diameter ranging from about 75 mm to about 90 mm. When worn, lenses 102A and 102B can extend across the wearer's normal straight ahead line of sight, and can extend substantially across the wearer's peripheral zones of vision. As used herein, the wearer's normal line of sight shall refer to a line projecting straight ahead of the wearer's eye, with substantially no angular deviation in either the vertical or horizontal planes. In some embodiments, lenses 102A and 102B can extend across a portion of the wearer's normal straight ahead line of sight. Providing curvature in the lenses 102A and 102B can result in various advantageous optical qualities for the wearer, including reducing the prismatic shift of light rays passing through the lenses 102A and 102B, and providing an optical correction, such as correcting an optical distortion or modifying an optical focal power. Regardless of the particular vertical or horizontal curvature of front surface 101 and rear surface 103 of each of lens 102A and 102B, however, other types of front surface 101 and rear surface 103 of each of lens 102A and 102B may be chosen such as to minimize one or more of power, prism, and astigmatism of lens 102A and 102B in the mounted and as-worn orientation. In some embodiments, each of lenses 102A and 102B can be a plano lens configured to provide the optical correction. In some embodiments, lenses 102A and 102B can be a lens blank or semi-finished so that lenses 102A and 102B can be capable of being machined, at some time following manufacture, to provide the optical correction for the wearer. In some embodiments, lenses 102A and 102B can have optical power and can be prescription lenses configured to correct for near-sighted or far-sighted vision. In some embodiments, lenses 102A and 102B can have cylindrical characteristics to correct for astigmatism. In some embodiments, lenses 102A and 102B can be canted and mounted in a position rotated laterally relative to centrally oriented dual lens mountings.

Mounting frame 104 can include orbitals that partially or completely surround the lenses 102A and 102B. Mounting frame 104 can be made of a variety of suitable materials including, for example and without limitation, metal, acetate, nylon, etc. Mounting frame 104 can be of varying configurations and designs, and the illustrated embodiment shown in FIG. 1 is provided for exemplary purposes only. As illustrated, mounting frame 104 can include a top frame portion and a pair of ear stems 106A and 106B connected to opposing ends of the top frame portion. Ear stems 106A and 106B can be configured to support the eyewear 100 when worn by a user. In some embodiments, eyewear 100 can include a flexible band (not shown in FIG. 1) used to secure eyewear 100 in front of the wearer's eyes in place of ear stems 106A and 106B. Further, lenses 102A and 102B may be mounted to the frame 104 with an upper edge of lens 102A and/or 102B extending along or within a lens groove and being secured to mounting frame 104. For example, the upper edge of lens 102A and/or or 102B can be formed in a pattern, such as a jagged or non-linear edge, and apertures or other shapes around which mounting frame 104 can be injection molded or fastened to secure lens 102A and/or 102B. Further, lenses 102A and 102B can be attachable to mounting frame 104 by means of a slot with inter-fitting projections or other attachment structure formed in lenses 102A and 102B and/or mounting frame 104. It is also contemplated that lenses 102A and 102B can be secured along a lower edge of mounting frame 104. Various other configurations can also be utilized. Such configurations can include direct attachments of ear stems 106A and 106B or a strap to lenses 102A and 102B without any frame, or other configurations that can reduce the overall weight, size, or profile of the eyeglasses. In some embodiments, mounting frame 104 can be configured to retain a unitary lens placed in front of both of the wearer's eyes. In some embodiments, the lens may be a standalone unitary lens that directly attach to ear stems 106A and 106B or to a strap.

Figure 2A:
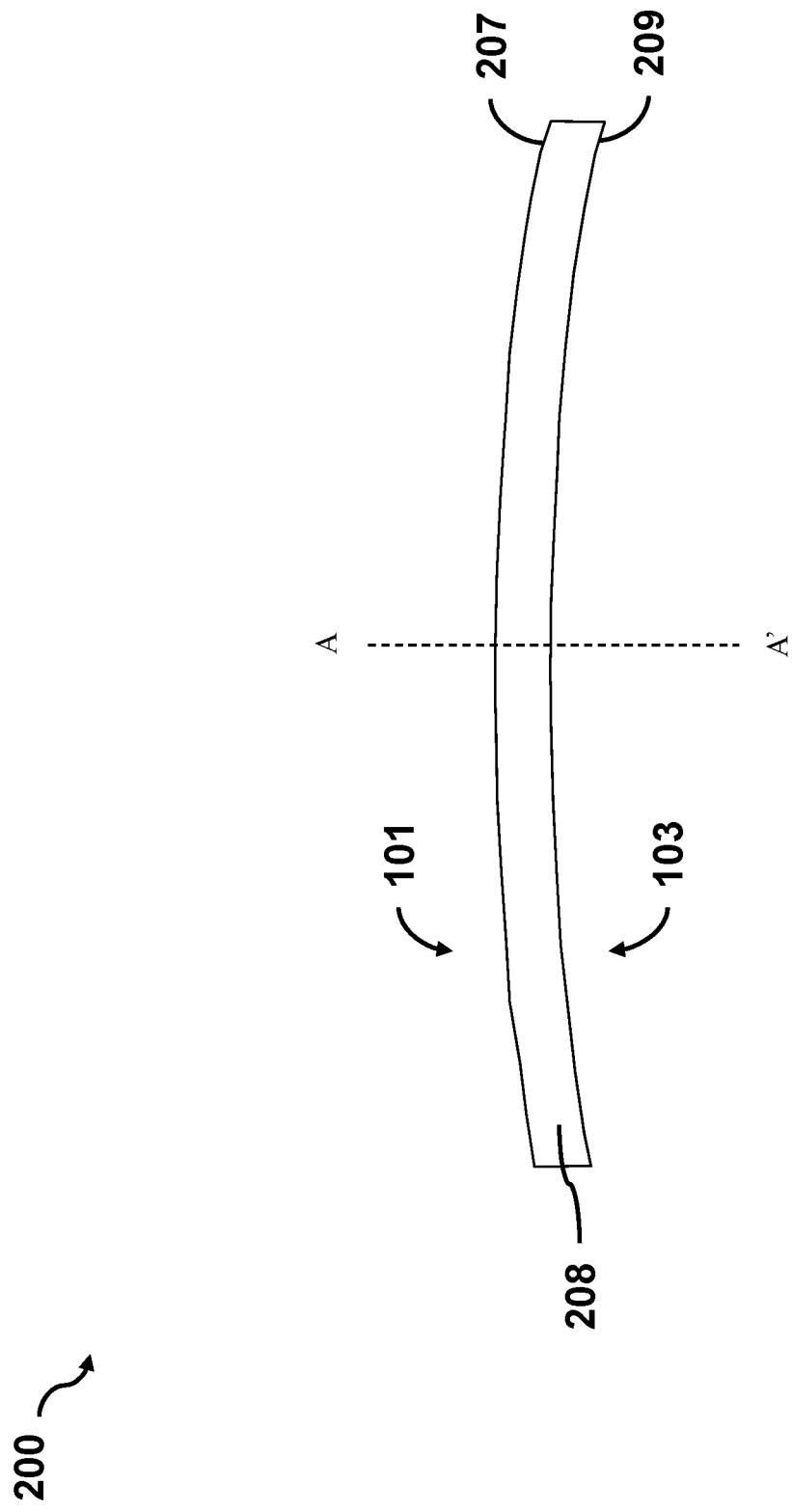
FIG. 2A illustrates a cross-sectional view of an optical filter, configured to provide chroma enhancement, of an eyewear, according to some embodiments.

FIG. 2A shows a cross-sectional view of a lens 200, according to some embodiments. Lens 200 can be an embodiment of lens 102A or lens 102B shown in FIG. 1. The discussion of lens 102A and lens 102B applies to lens 200, unless mentioned otherwise. Further, the discussion of elements with the same annotations in FIGS. 1 and 2A applies to each other, unless mentioned otherwise. Section line A-A' is shown in both FIG. 1 and FIG. 2A to illustrate the relative orientation of lens 200 (e.g., lens 102) between the two figures. As shown in FIG. 2A, lens 200 can have front surface 101 and rear surface 103, can include a lens body 208 having a front surface 207 and a rear surface 209. In some embodiments, front surface 207 and rear surface 209 can respectively represent lens 200's front surface and rear surface.

Lens body 208 can be configured to have high optical transmittance in the visible spectral range. In some embodiments, lens body 208 can have an optical transmittance greater than about 50%, greater than about 60%, greater than about 70%, greater than about 80%, greater than about 85%, or greater than about 90% across or over the visible spectral range. In some embodiments, lens body 208 can have visible light transmittance (VLT) greater than about 55%, greater than about 70%, greater than about 75%, greater than about 80%, greater than about 85%, or greater than about 90%. In some embodiments, VLT can be the mean transmittance between 380 nm and 780 nm as calculated according to section 5.6.2 of ANSI specification Z80.3-2009. In some embodiments, lens body 208 can have VLT between about 55% and about 95%, between about 60% and about 92%, or between about 65% and about 90%. In some embodiments, lens body 208 can have an substantially uniform optical transmittance across or over the visible spectral range. For example, lens body 208 can have an optical transmittance between about 60% and about 100%, between about 70% and about 100%, between about 80% and about 100%, or between about 85% and about 90% across or over the visible spectral range.

Lens body 208 can be made of any suitable material having a refractive index between 1.45 and 1.85, or between 1.4 and 2.0, or between 1.4 and 2.5, or between 1.4 and 3.0. For example, lens body 208 can be formed of polycarbonate (PC), allyl diglycol carbonate monomer (being sold under the brand name CR-39®), a resin layer (e.g., MR-8®), glass, nylon, polyurethane, polyethylene, polyamide (PA), polyethylene terephthalate (PET), biaxially-oriented polyethylene terephthalate polyester film (BoPET, with one such polyester film sold under the brand name MYLAR®), acrylic (polymethyl methacrylate or PMMA), triacetate cellulose (TAC), a polymeric material, a co-polymer, a doped material, any other suitable material, or any combination of materials. In some embodiments, lens body 208 can be an injection molded, polymeric lens body.

Lens body 208 can have a concave surface and a convex surface. Lens body 208 can have a desired base curve to provide the optical correction. For example, each of lens body 208's front surface 207 and rear surface 209 can have a spheric, toric, cylindrical, or freeform geometry with proper thickness distribution (e.g., tapering thickness along front surface 207 and/or rear surface 209). Front surface 207 and/or rear surface 209 can have spheric, toric, or cylindrical geometries with a non-zero base curve in a horizontal and/or vertical direction. In some embodiments, front surface 207 and/or rear surface 209 can have spheric, toric, or cylindrical geometries with a base curve of about base 4 and greater, about base 6 and greater, or about base 8 and greater.

In some embodiments, lens body 208 can further integrate with one or more chroma enhancement filters configured to increase a scene's vividness viewed through eyewear 100. For example, the chroma enhancement filters can be dispersed throughout lens body 208. In some embodiments, the chroma enhancement filter can be at least partially incorporated into lens body 208. In some embodiments, lens body 208 can be impregnated with, loaded with, or otherwise include the chroma enhancement filters. The vividness of interpreted colors can be correlated with an attribute known as a chroma value of a color. The chroma value can be one of the attributes or coordinates of the CIE L*C*h* color space. In some embodiments, the definition of attributes or coordinates of the CIE L*C*h* color space is disclosed in U.S. Pat. Pub. No. 2016/0070119, entitled "Eyewear with Chroma Enhancement," filed Sep. 11, 2015, which is incorporated by reference herein in its entirety so as to form part of this specification. Together with attributes known as hue and lightness, the chroma value can be used to define colors perceivable in human vision. It has been determined that visual acuity can be positively correlated with the chroma values of colors in an image. In other words, the visual acuity of an observer can be greater when viewing a scene with high chroma value colors than when viewing the same scene with lower chroma value colors. Therefore, lens body 208 can be configured to enhance the chroma profile of a scene viewed through optical filter 200. In some embodiments, lens body 208 having chroma enhancement properties can be a molded body. In some embodiments, the chroma enhancement filter can be provided as a layer enclosed by or intermixed with lens body 208. In some embodiments, lens body 208 having chroma enhancement properties can be configured to increase or decrease the chroma value in one or more chroma enhancement windows in the visible spectral range. The chroma enhancement filter(s) integrated with lens body 208 can be further configured to preferentially transmit or attenuate light in the one or more chroma enhancement windows to provide enhanced chroma values. For example, an environment can predominantly reflect or emit a color, where the chroma enhancement filter integrated with lens body 208 can be adapted to provide the chroma enhancement by attenuating or enhancing an optical transmittance for one or more wavelengths associated with the predominantly reflected or emitted color. In some embodiments, the chroma enhancement filter integrated with lens body 208 can include a dye, such as an organic dye. In some embodiments, the dye of the chroma enhancement filter can include one or more of dyes supplied by Epolin Inc, Crysta-lyn, Adam Gates Company, HW Sands Corp, Yamada Chemical Co., and Gentex Corp. In some embodiments, examples of the chroma enhancement filters are disclosed in U.S. Pat. Pub. No. 2016/0070119, entitled "Eyewear with Chroma Enhancement," filed Sep. 11, 2015, which is incorporated by reference herein in its entirety so as to form part of this specification.

In some embodiments, lens 200 can further include one or more functional layers (not shown in FIG. 2A), such as an optical filter configured to provide optical filtering, a polarizer configured to provide polarization, an electro-chromic layer configured to provide electrochromism, a reflection layer configured to provide a partial reflection of incoming visible light, an absorption layer configured to provide a partial or complete absorption of infrared light, a color enhancement layer, a color alteration layer, an anti-static functional layer, an anti-fog functional layer, a scratch resistance layer, a mechanical durability layer, a hydrophobic functional layer, a reflective functional layer, a darkening functional layer, an aesthetic functional layer including tinting, a glue layer, a mechanical protection layer configured to provide mechanical protection to lenses 102A and 102B, to reduce stresses within lens 200, or to improve bonding or adhesion among the layers in lens 200, a physical vapor deposition (PVD) layer, or any combination of these. In some embodiments, the chroma enhancement filter can be at least partially incorporated into the one or more functional layers in lens 200. In some embodiments, the one or more functional layers in lens 200 can be impregnated with, loaded with, or otherwise include the chroma enhancement filters.

Figure 2B:
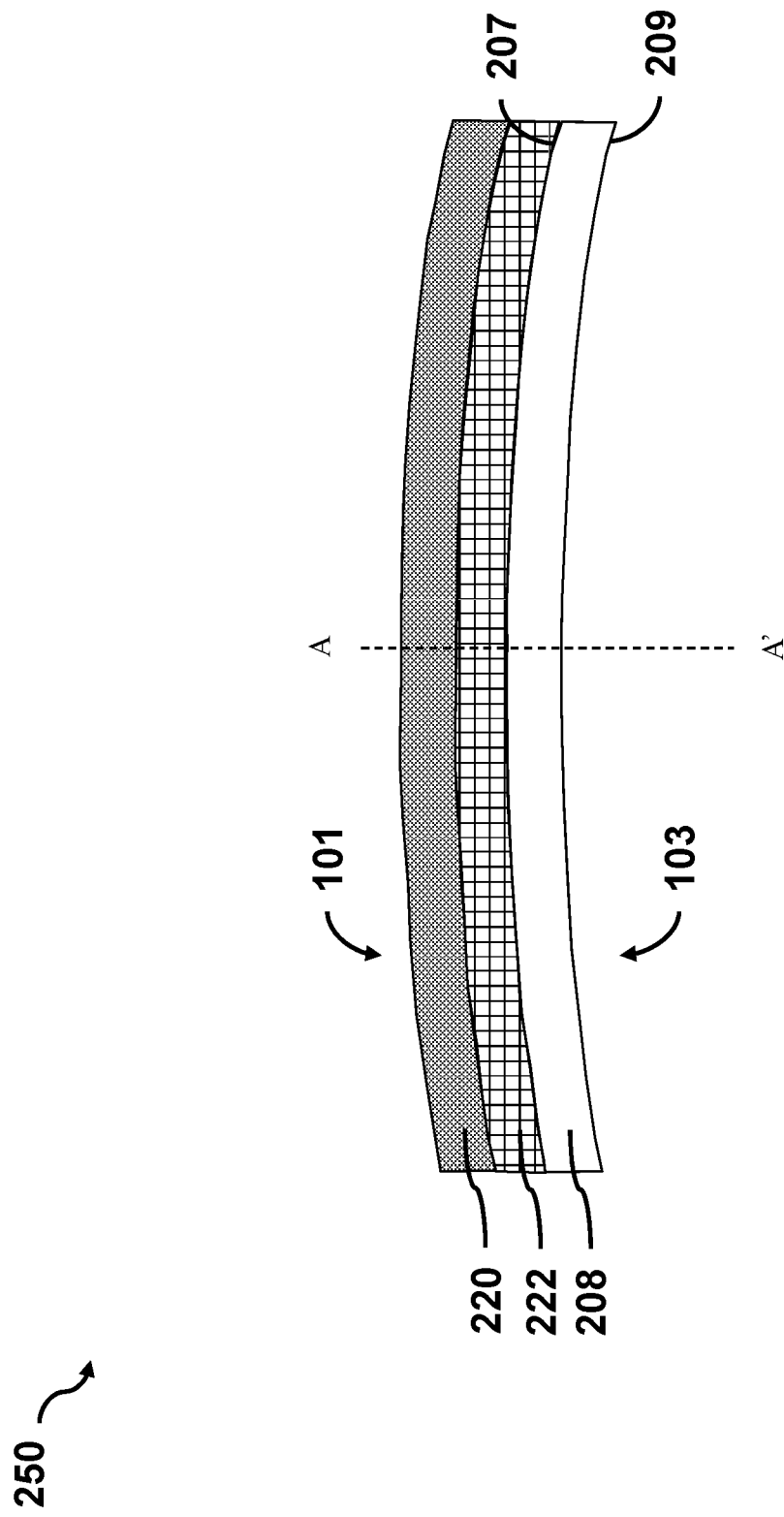
FIGS. 2B and 2C illustrate cross-sectional views of an optical filter, configured to provide chroma enhancement, of an eyewear, according to some embodiments.

FIG. 2B shows a cross-sectional view of lens 250, according to some embodiments. Lens 250 can be an embodiment of lens 102 (shown in FIG. 1) or lens 200 (shown in FIG. 2A). The discussion of lens 102 and lens 200 applies to lens 250, unless mentioned otherwise. Further, the discussion of elements with the same annotations in FIGS. 1, 2A and 2B applies to each other, unless mentioned otherwise. As shown in FIG. 2B, lens 250 can have front surface 101 and rear surface 103, lens body 208, and a chroma enhancement layer 222 coupled to lens body 208.

Figure 2C:
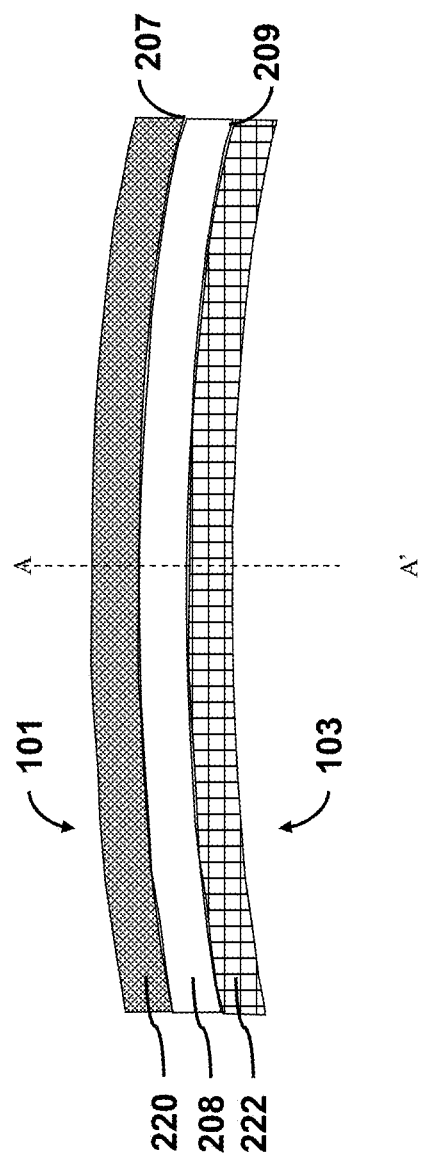

Chroma enhancement layer 222 can be placed over lens body 208's front surface 207 and/or lens body 208's rear surface 209 as shown in FIG. 2C. In some embodiments, chroma enhancement layer 222 can physically contact lens body 208. Chroma enhancement layer 222 can be configured to provide the chroma enhancement for lens 250. In some embodiments, chroma enhancement layer 222 can be configured to increase or decrease the chroma value in one or more chroma enhancement windows in the visible spectral range. Chroma enhancement layer 222 can be further configured to preferentially transmit or attenuate light in the one or more chroma enhancement windows to provide enhanced chroma values. For example, an environment can predominantly reflect or emit a color, where chroma enhancement layer 222 can be adapted to attenuate or enhance an optical transmittance for one or more wavelengths associated with the predominantly reflected or emitted color.

In some embodiments, lens 250 can further include a variable transmission layer 220 disposed over lens body 208. Variable transmission layer 220 can be, for example, a photochromic layer or electrochemical cell. For example, variable transmission layer 220 can include any suitable photochromic material configured to darken on exposure to light of a specific wavelength, such as ultraviolet radiation. In the absence of such light, the photochromic material can be configured to switch back to a clear state (e.g., a transparent state). In some embodiments, variable transmission layer 220 can be disposed over lens body 208's front surface 207 and/or rear surface 209. In some embodiments of lens 250, variable transmission layer 220 can be sandwiched between lens body 208 and chroma enhancement layer 222. In some embodiments, variable transmission layer 220 can be disposed over chroma enhancement layer 222. In some embodiments of lens 250, lens body 208 can be sandwiched between variable transmission layer 220 and chroma enhancement layer 222. In some embodiments of lens 200, variable transmission layer 220 can be disposed over lens body 208, where lens body 208 can be configured to provide the chroma enhancement with high optical transmittance across or over the visible spectral range (this embodiment is not shown in FIGS. 2A-2B). In some embodiments, the chroma enhancement filter can be at least partially incorporated into variable transmission layer 220. In some embodiments, variable transmission layer 220 can be impregnated with, loaded with, or otherwise include the chroma enhancement filter.

In some embodiments, lens 250 can further include one or more functional layers (not shown in FIG. 2B), such as an optical filter configured to provide optical filtering, an polarizer configured to provide a polarization, an electro-chromic layer configured to provide an electrochromism, a reflection layer configured to provide a partial reflection of incoming visible light, an absorption layer configured to provide a partial or complete absorption of infrared light, a color enhancement layer, a color alteration layer, an anti-static functional layer, an anti-fog functional layer, a scratch resistance layer, a mechanical durability layer, a hydrophobic functional layer, a reflective functional layer, a darkening functional layer, an aesthetic functional layer including tinting, a glue layer, a mechanical protection layer configured to provide mechanical protection to lenses 102A and 102B, to reduce stresses within lens 250, or to improve bonding or adhesion among the layers in lens 200, a physical vapor deposition (PVD) layer, or any combination of these. In some embodiments, the chroma enhancement filter can be at least partially incorporated into the one or more functional layers in optical filter 250. In some embodiments, the one or more functional layer in optical filter 250 can be impregnated with, loaded with, or otherwise include the chroma enhancement filters.

Figure 3A:
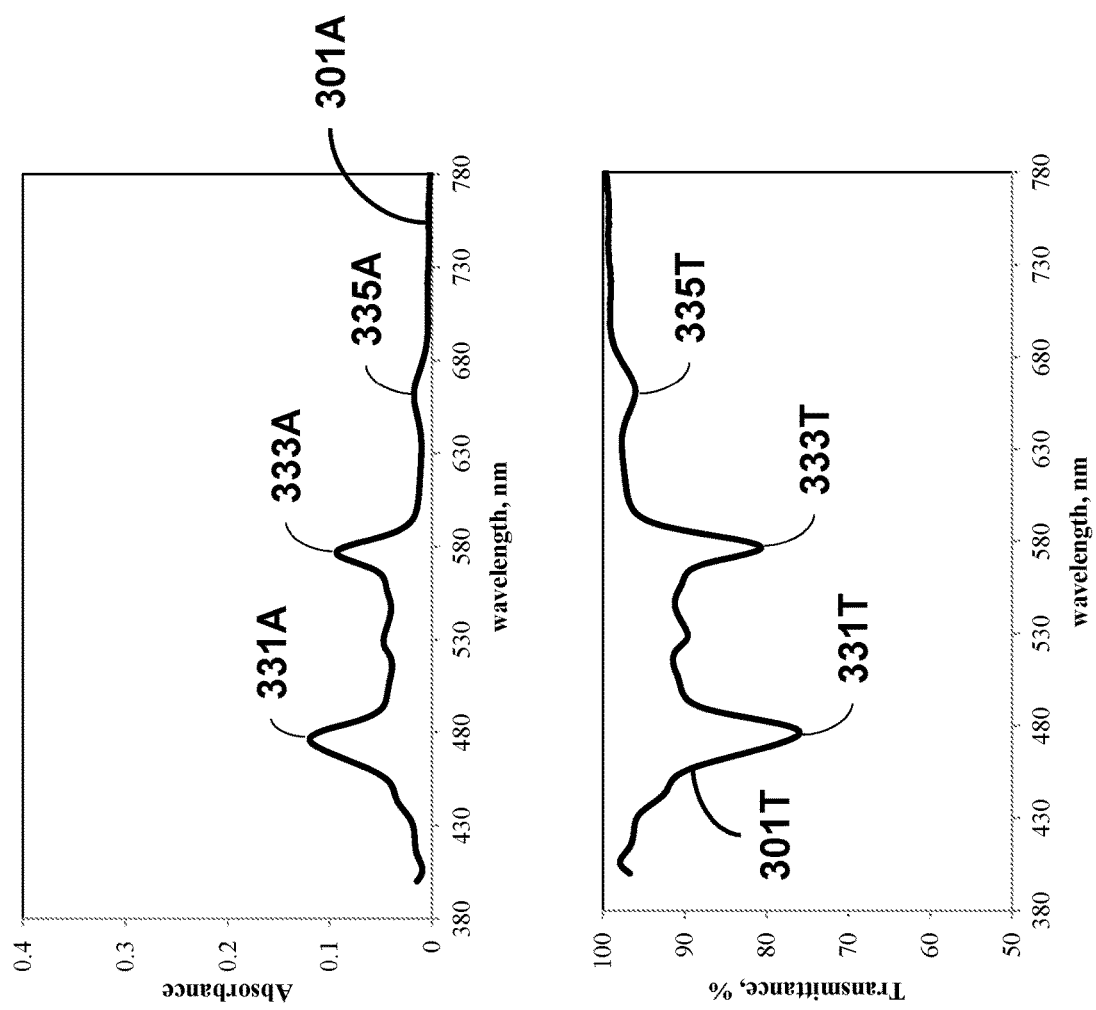
FIGS. 3A and 3B show optical characteristics of an optical filter, configured to provide chroma enhancement, of an eyewear, according to some embodiments.
Figure 3B:
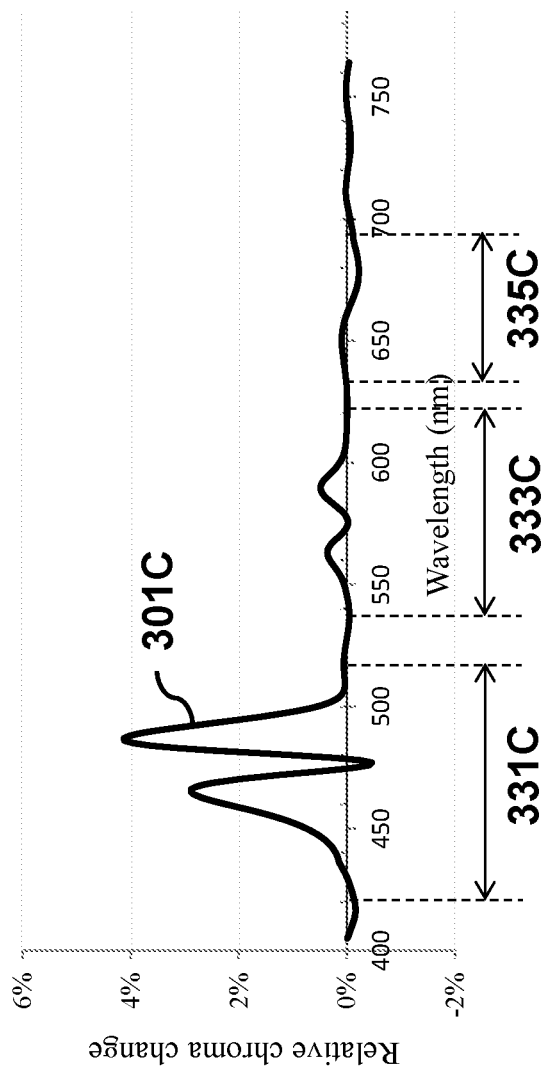

FIG. 3A illustrates an optical transmittance profile 301T and a respective optical absorbance profile 301A of a chroma enhancement filter, according to some embodiments. In some embodiments, the chroma enhancement filter having optical transmittance profile 301T can be integrated with or added to lens body 208 (e.g., lens body 208 that integrates with the chroma enhancement filter can exhibit optical transmittance profile 301T). In some embodiments, optical transmittance profile 301T can represent an optical transmittance of chroma enhancement layer 222 (e.g., a measured optical transmittance of chroma enhancement layer 222),In some embodiments, optical transmittance profile 301T can represent an internal optical transmittance of chroma enhancement layer 222. In some embodiments, the term "internal optical transmittance" of a filter can represent a component of the optical transmittance that is not caused by the filter's optical reflection (e.g., the internal optical transmittance of the filter is substantially determined by the filter's optical absorption behavior.) FIG. 3B illustrates a relative chroma change profile 301C associated with optical transmittance profile 301T and optical absorbance profile 301A, according to some embodiments. It would be understood that optical characteristics exhibited in FIGS. 3A and 3B are merely illustrative and not intended to be limiting, unless mentioned otherwise. As shown in FIG. 3A, optical transmittance profile 301T can have an optical transmittance greater than about 70% across the wavelength range between about 400 nm and about 780 nm. In some embodiments, optical transmittance profile 301T can have an optical transmittance greater than about 50%, greater than about 55%, greater than about 60%, greater than about 70%, or greater than about 75% across the wavelength range between about 400 nm and about 780 nm. In some embodiments, optical transmittance profile 301T can be associated with VLT greater than about 55%, greater than about 70%, greater than about 75%, greater than about 80%, greater than about 85%, or greater than about 90%. In some embodiments, optical transmittance profile 301T can be associated with VLT between about 55% and about 95%, between about 60% and about 92%, or between about 65% and about 90%. In some embodiments, portions of optical transmittance profile 301T can have an optical transmittance below 50% over the wavelength range between about 400 nm and about 780 nm, while optical transmittance profile 301T can still be associated with a high VLT to provide a high transparency. For example, optical transmittance profile 301T can have a minimum optical transmittance between about 0% and about 50%, between about 10% and about 50%, between about 20% and about 50%, between about 30% and about 50%, or between about 40% and about 50% over the wavelength range between about 400 nm and about 780 nm, where optical transmittance profile 301T can be associated with VLT greater than about 55%, greater than about 70%, greater than about 75%, greater than about 80%, greater than 85%, greater than about 90%, between about 55% and about 95%, between about 60% and about 92%, or between about 65% and about 90%.

Optical transmittance profile 301T can include one or more transmittance valleys, such as valleys 331T, 333T, and 335T, each having a minimum transmittance in one or more spectral bands. Such transmittance valleys (e.g., valleys 331T, 333T, and 335T) can filter out or attenuate undesired spectral wavelengths of light that are not sensitive to human eyes. Accordingly, optical transmittance profile 301T can provide chroma enhancement in the one or more spectral bands. A transmittance valley can be defined by a position of a minimum optical transmittance in a middle portion of a spectral band between lower and upper edge portions of the spectral band, the lower and upper edge portions having an optical transmittance that is substantially greater than the minimum optical transmittance. On the other hand, an absorbance peak can be defined by a position of a maximum absorbance in a middle portion of a spectral band between lower and upper edge portions of the spectral band, the upper and lower edge portions having an optical absorbance substantially below the maximum absorbance. An optical transmittance valley can be associated with a respective optical absorbance peak. For example, an optical filter can have an optical characteristic including an optical reflectivity R, an optical transmittance T, an optical absorptance $A_P$, and an optical absorbance $A_B$. In some embodiments, optical absorptance $A_P$ can be about equal to $(1-T-R)$, and optical absorbance $A_B$ can be about equal to the magnitude of the logarithm of optical transmittance T, such as $-\log_{10}(T)$. In some embodiments, the optical reflectivity R can be relatively wavelength-insensitive as compared to the optical transmittance T, the optical absorptance $A_P$, and the optical absorbance $A_B$. In some embodiments, optical absorptance $A_P$ and optical absorbance $A_B$ can be substantially determined by optical transmittance T (e.g., optical reflection R's magnitude can be very minimal compared to the magnitude of optical transmittance T's magnitude). Therefore, in some embodiments, the optical transmittance valley and the respective absorbance peak can be positioned at about the same wavelength. Accordingly, each of the transmittance valleys in a spectrum can be regarded as an absorbance peak in the spectrum. For example, each of valleys 331T, 333T, and 335T illustrated in optical transmittance profile 301T can be hereinafter represented as absorbance peaks 331A, 333A, and 335A in optical absorbance profile 301A. As such, in referring to FIG. 3A, optical absorbance profile 301A can include an absorbance peak 331A associated with valley 331T, and an absorbance peak 333A associated with valley 333T. Absorbance peak 331A can have a maximum optical density (e.g., optical absorbance $A_B$) between about 0.1 and about 0.3, and can be positioned in a spectral band between about 450 nm and about 500 nm. Accordingly, optical densities at a lower edge portion (e.g., closer to about 450 nm) and a upper edge portion (e.g., closer to about 500 nm) of the spectral band (e.g., between about 450 nm and about 500 nm) can be less than that of absorbance peak 331A. Namely, absorbance peak 331A can have greater absorbance than the lower edge and the upper edge portions of the spectral band. Similarly, absorbance peak 333A can have a maximum optical density between about 0.07 and about 0.3, and can be positioned in a spectral band between about 570 nm and about 590 nm. Absorbance peak 335A can have a maximum optical density between about 0.0 and about 0.1, and can be positioned in a spectral band between about 640 nm and about 680 nm, or between about 630 nm or about 690 nm. In some embodiments, optical absorbance profile 301A can have an optical density between about 0.1 and 0.3 in a spectral band between about 380 nm and about 400 nm.

In some embodiments, absorbance peak 331A can have a maximum optical density between about 0.05 and about 0.35. In some embodiments, absorbance peak 331A can have a maximum optical density between about 0.35 and about 0.7, between about 0.35 and about 0.6, between about 0.35 and about 0.5, or between about 0.35 and about 0.4, where the respective optical transmittance profile 301T can be associated with VLT greater than about 55%, greater than about 70%, greater than about 75%, greater than about 80%, greater than 85%, greater than about 90%, between about 55% and about 95%, between about 60% and about 92%, or between about 65% and about 90%. In some embodiments, the maximum optical density of absorbance peak 331A can be positioned in a spectral band between about 440 nm and about 520 nm, or between about 430 nm and about 530 nm. In some embodiments, absorbance peak 333A can have a maximum optical density between about 0.01 and about 0.35. In some embodiments, absorbance peak 333A can have a maximum optical density between about 0.35 and about 0.7, between about 0.35 and about 0.6, between about 0.35 and about 0.5, or between about 0.35 and about 0.4, where the respective optical transmittance profile 301T can be associated with VLT greater than about 55%, greater than about 70%, greater than about 75%, greater than about 80%, greater than 85%, greater than about 90%, between about 55% and about 95%, between about 60% and about 92%, or between about 65% and about 90%. In some embodiments, the maximum optical density of absorbance peak 333A can be positioned in a spectral band between about 540 nm and about 620 nm, or between about 530 nm and about 630 nm. In some embodiments, absorbance peak 331A's optical density can be equal to or less than absorbance peak 333A's optical density. In some embodiments, absorbance peak 331A's optical density can be greater than absorbance peak 333A's optical density. In some embodiments, in optical absorbance profile 301A, an optical density in a spectral band between absorbance peaks 331A and 333A can be less than the maximum optical density of each of the absorbance peaks 331A and 333A. In some embodiments, in optical absorbance profile 301A, an optical density in a spectral band between about 400 nm and about 430 nm can be less than the maximum optical density of absorbance peak 331A. In some embodiments, in optical transmittance profile 301, an optical density in a spectral band larger than 630 nm can be less than the maximum optical density of absorbance peak 333A. In some embodiments, absorbance peak 335A can have a maximum optical density between about 0 and about 0.1. In some embodiments, absorbance peak 335A can have a maximum optical density between about 0.1 and about 0.4, between about 0.1 and about 0.3, or between about 0.1 and about 0.2, where the respective optical transmittance profile 301T can be associated with VLT greater than about 55%, greater than about 70%, greater than about 75%, greater than about 80%, greater than 85%, greater than about 90%, between about 55% and about 95%, between about 60% and about 92%, or between about 65% and about 90%. In some embodiments, the maximum optical density of absorbance peak 335A can be positioned in a spectral band between about 620 nm and about 700 nm, or between about 640 nm and about 680 nm.

Each absorbance peak in optical absorbance profile 301A can have a respective absorbance bandwidth defined as a full width of the each absorbance peak at 80% of the maximum absorbance of the each absorbance peak, a full width of the each absorbance peak at 90% of the maximum absorbance of the each absorbance peak, or a full width of the each absorbance peak at 95% of the maximum absorbance of the each absorbance peak. In some embodiments, absorbance peak 331A can have the absorbance bandwidth of less than about 50 nm, less than about 40 nm, less than about 30 nm, less than about 20 nm, less than about 15 nm, less than about 10 nm, or less than about 5 nm. In some embodiments, absorbance peak 333A can have an absorbance bandwidth less than about 50 nm, less than about 40 nm, less than about 30 nm, less than about 20 nm, less than about 15 nm, less than about 10 nm, or less than about 5 nm. In some embodiments, absorbance peak 335A can have the absorbance bandwidth less than about 50 nm, less than about 40 nm, less than about 30 nm, less than about 20 nm, less than about 15 nm, less than about 10 nm, or less than about 5 nm.

Each absorbance peak in optical absorbance profile 301A can be associated with an absorption peak (not shown in FIG. 3A) having a maximum absorptance in the respective one or more spectral bands. The spectral bandwidth of the absorptance peak can be defined as a full width of the absorptance peak at 80% of the maximum absorptance of the absorptance peak, 90% of the maximum absorptance of the absorptance peak, or 95% of the maximum absorptance of the absorptance peak. An attenuation factor associated with each absorbance peak in optical absorbance profile 301A can be obtained by dividing an integration of the respective absorptance peak's area within the spectral bandwidth by the absorbance bandwidth of the each absorbance peak. In some embodiments, the attenuation factor associated with absorbance peak 331A can range from about 0.03 to about 0.8, from about 0.03 to about 0.75, from about 0.03 to about 0.65, from about 0.03 to about 0.55, from about 0.03 to about 0.45, from about 0.03 to about 0.35, from about 0.03 to about 0.3, from about 0.03 to about 0.25, from about 0.03 to about 0.2, from about 0.03 to about 0.15, or from about 0.03 to about 0.1. In some embodiments, the attenuation factor associated with absorbance peak 333A can range from about 0.03 to about 0.8, from about 0.03 to about 0.75, from about 0.03 to about 0.65, from about 0.03 to about 0.55, from about 0.03 to about 0.45, from about 0.03 to about 0.3, from about 0.03 to about 0.25, from about 0.03 to about 0.2, from about 0.03 to about 0.15, or from about 0.03 to about 0.1. In some embodiments, the attenuation factor associated with absorbance peak 335A can range from about 0.01 to about 0.8, from about 0.01 to about 0.75, from about 0.01 to about 0.65, from about 0.01 to about 0.55, from about 0.01 to about 0.45, from about 0.01 to about 0.25, from about 0.01 to about 0.2, from about 0.01 to about 0.15, or from about 0.01 to about 0.1.

Each transmittance valley in optical transmittance profile 301T can have a respective transmittance bandwidth defined as a full width of the each transmittance valley at certain offset from the minimum transmittance of the each transmittance valley, such as the minimum transmittance plus 1%, the minimum transmittance plus 2%, the minimum transmittance plus 5%, the minimum transmittance plus 10%, or the minimum transmittance plus 20%. In some embodiments, each of transmittance valleys 331T, 333T and 335T can have a transmittance bandwidth of less than about 50 nm, less than about 40 nm, less than about 30 nm, less than about 20 nm, less than about 15 nm, less than about 10 nm, or less than about 5 nm.

As previously discussed, by filtering out undesired wavelengths that are insensitive to human eyes, one or more absorbance peaks in optical absorbance profile 301A can be associated with a respective chroma enhancement window to alter a chroma value that improves vividness of a scene seen through eyewear 100. The chroma enhancement window can include portions of the visible spectrum in which chroma enhancement filters incorporated in lens body 208 or chroma enhancement layer 222 can provide a substantial change in chroma compared to a neutral filter having the same average attenuation within each 30 nm stimulus band, as perceived by a person with normal vision. In other words, a lower end of the chroma enhancement window can encompass a wavelength above which the chroma enhancement filters can provide chroma enhancement. Similarly, an upper end of the chroma enhancement window can encompass a wavelength below which the chroma enhancement filters can provide chroma enhancement. Referring to FIGS. 3A and 3B, in some embodiments, absorbance peak 331A and transmittance valley 331T can be associated with a chroma enhancement window 331C in a spectral range of about 420 nm to about 520 nm, or about 450 nm to about 500 nm. For example, the maximum absorbance of absorbance peak 331A, the minimum transmittance of transmittance valley 331T and the chroma enhancement window 331C can all be positioned in a spectral range of about 440 nm to about 520 nm or about 457 nm to about 497 nm. In some embodiments, absorbance peak 331A and/or transmittance valley 331T can be located at about a center of the chroma enhancement window 331C, such as at about 467 nm, about 472 nm, about 477 nm, about 482 nm, or about 487 nm. In some embodiments, transmittance valley 331T can have a minimum transmittance greater than about 50%, greater than about 60%, or greater than about 70%. In some embodiments, transmittance valley 331T can have a minimum transmittance between about 0% and about 50%, between about 10% and about 50%, between about 20% and about 50%, between about 30% and about 50%, or between about 40% and about 50%, where the respective optical transmittance profile 301T can be associated with VLT greater than about 55%, greater than about 70%, greater than about 75%, greater than about 80%, greater than 85%, greater than about 90%, between about 55% and about 95%, between about 60% and about 92%, or between about 65% and about 90%.

The average chroma enhancement value in chroma enhancement window 331C can be increased by greater than about 0.1%, greater than about 0.3%, greater than about 0.5%, greater than about 0.7%, greater than about 1%, greater than about 1.2%, greater than about 1.5%, greater than about 3%, greater than about 5%, greater than about 8%, greater than about 10%, greater than about 12%, or greater than about 15%, when comparing to a neutral filter. In some embodiments, the term "average chroma enhancement value within a chroma enhancement window" can be an average value (e.g., an average value of a function) of a relative chroma change profile within the interval of the chroma enhancement window. In some embodiments, absorbance peak 333A and transmittance valley 333T can be associated with a chroma enhancement window 333C in a spectral range of about 530 nm to about 620 nm, or about 570 nm to about 585 nm. For example, the maximum absorbance of absorbance peak 333A, the minimum transmittance of transmittance valley 331T and the chroma enhancement window 333C can all be positioned in a spectral range of about 540 nm to about 620 nm, about 550 nm to about 600 nm, or about 572 nm to about 582 nm. In some embodiments, absorbance peak 333A and/or transmittance valley 333T can be located at about a center of the chroma enhancement window 333C, such as at about 574 nm, about 577 nm, or about 580 nm. In some embodiments, transmittance valley 333T can have a minimum transmittance greater than about 50%, greater than about 60%, or greater than about 70%. In some embodiments, transmittance valley 333T can have a minimum transmittance between about 0% and about 50%, between about 10% and about 50%, between about 20% and about 50%, between about 30% and about 50%, or between about 40% and about 50%, where the respective optical transmittance profile 301T can be associated with VLT greater than about 55%, greater than about 70%, greater than about 75%, greater than about 80%, greater than 85%, greater than about 90%, between about 55% and about 95%, between about 60% and about 92%, or between about 65% and about 90%. The average chroma enhancement value in chroma enhancement window 333C can be increased by greater than about 0.1%, greater than about 0.2%, greater than about 0.3%, greater than about 0.5%, greater than about 0.7%, greater than about 1%, greater than about 1.2%, greater than about 1.5%, greater than about 3%, greater than about 5%, greater than about 8%, greater than about 10%, greater than about 12%, or greater than about 15%, when comparing to the neutral filter.

In some embodiments, absorbance peak 335A and transmittance valley 335T can be associated with a chroma enhancement window 335C in a spectral range of about 630 nm to about 700 nm, or about 640 nm to about 680 nm. For example, the maximum absorbance of absorbance peak 335A, the minimum transmittance of transmittance valley 335T and the chroma enhancement window 335C can all be positioned in a spectral range of about 620 nm to about 700 nm or about 655 nm to about 675 nm. In some embodiments, absorbance peak 335A and/or transmittance valley 335T can be located at about a center of the chroma enhancement window 335C, such as at about 650 nm, about 660 nm, or about 670 nm. In some embodiments, transmittance valley 335T can have a minimum transmittance greater than about 50%, greater than about 60%, or greater than about 70%. In some embodiments, transmittance valley 335T can have a minimum transmittance between about 0% and about 50%, between about 10% and about 50%, between about 20% and about 50%, between about 30% and about 50%, or between about 40% and about 50%, where the respective optical transmittance profile 301T can be associated with VLT greater than about 55%, greater than about 70%, greater than about 75%, greater than about 80%, greater than 85%, greater than about 90%, between about 55% and about 95%, between about 60% and about 92%, or between about 65% and about 90%. The average chroma enhancement value in chroma enhancement window 335C can be increased by greater than about 0.1%, greater than about 0.2%, greater than about 0.3%, greater than about 0.5%, greater than about 0.7%, greater than about 1%, greater than about 1.2%, greater than about 1.5%, greater than about 3%, greater than about 5%, greater than about 8%, greater than about 10%, greater than about 12%, or greater than about 15%, when comparing to the neutral filter.

Figure 4A:
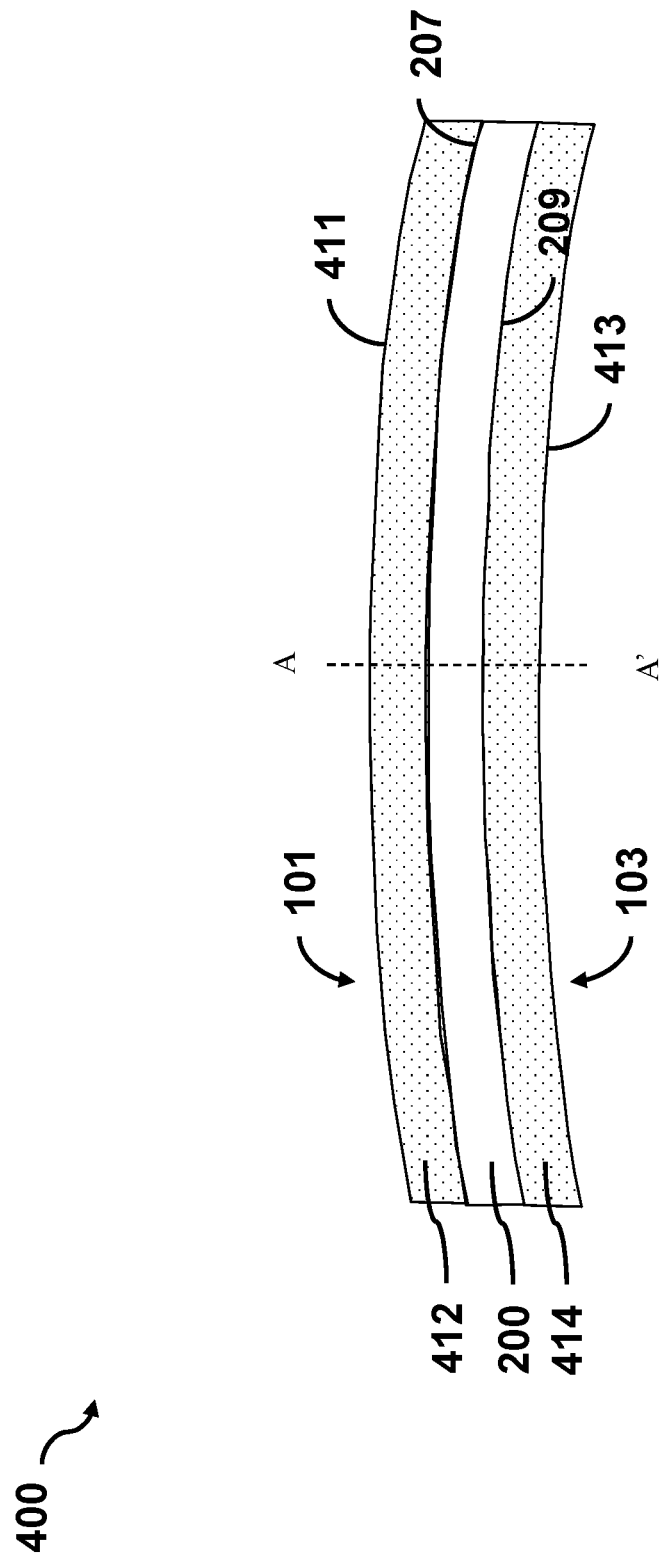
FIG. 4A illustrates a cross-sectional view of an optical filter, configured to provide chroma enhancement, of an eyewear, according to some embodiments.

FIG. 4A shows a cross-sectional view of high transmittance lens 400, according to some embodiments. High transmittance lens 400 can be an embodiment of lens 102 shown in FIG. 1 or lens 200 shown in FIG. 2A. The discussion of lenses 102 and 200 apply to high transmittance lens 400, unless mentioned otherwise. Further, the discussion of elements with the same annotations in FIGS. 1, 2A, and 4A applies to each other, unless mentioned otherwise. As shown in FIG. 4A, high transmittance lens 400 can include lens 200, and a transmittance enhancement layer 412 coupled to lens 200. For example, transmittance enhancement layer 412 can be coupled to lens 200's lens body 208's front surface 207. In some embodiments, transmittance enhancement layer 412 can be integrated into lens 200's lens body 208 (this embodiment is not shown in FIGS. 4A-4B). In some embodiments, as shown in FIG. 4A, high transmittance lens 400 can further include an anti-reflection layer 414 disposed over lens 200. For example, anti-reflection layer 414 can be disposed over lens 200's lens body 208's rear surface 209. In some embodiments, high transmittance lens 400 can include another transmittance enhancement layer 412 disposed over lens 200's lens body 208's rear surface 209 (this embodiment is not shown in FIG. 4A).

Transmittance enhancement layer 412 can be configured to increase an optical transmittance, across or over the visible spectrum range, between high transmittance lens 400's front surface 101 and high transmittance lens 400's rear surface 103, as compared to an otherwise identical lens without transmittance enhancement layer 412. In some embodiments, transmittance enhancement layer 412 can be configured to uniformly increase an optical transmittance through high transmittance lens 400 across or over the visible spectral range. For example, an optical transmittance of high transmittance lens 400 that includes transmittance enhancement layer 412 can be greater than an optical transmittance of a counterpart of high transmittance lens 400 that excludes transmittance enhancement layer 412 by more than about 0.5%, more than about 1%, more than about 2%, more than about 3%, more than about 4%, more than about 5%, more than about 6%, more than about 8%, more than about 10%, more than about 15%, or more than about 20% across or over the visible spectral range. In some embodiments, high transmittance lens 400 that includes transmittance enhancement layer 412 can have a VLT greater than about 55%, greater than about 70%, greater than about 75%, greater than about 80%, greater than 85%, or greater than about 90%. In some embodiments, high transmittance lens 400 that includes transmittance enhancement layer 412 can have a VLT between about 55% and about 95%, between about 60% and about 92%, or between about 65% and about 90%.

In some embodiments, transmittance enhancement layer 412 can be an index-matching layer disposed between lens body 208 and eyewear 100's working environment (e.g., air). Transmittance enhancement layer 412 can have a refractive index between air's refractive index and its underlying substrate's refractive index, For example, transmittance enhancement layer 412 can have a refractive index between 1.0 (e.g., the air) and lens body 208's refractive index. In some embodiments, lens 200's lens body 208's refractive index can be about 1.59, about 1.67, or about 1.74. Transmittance enhancement layer 412 can be disposed over lens body 208 to form a first interface of air/transmittance enhancement layer 412 and a second interface of transmittance enhancement layer 412/lens body 208 (and/or hard coat layer 416). The first and the second interfaces can enhance an optical transmittance for a visible light transmitting through lens body 208. In other words, transmittance enhancement layer 412 can help to match or reduce a difference in optical impedance to reconcile a refractive index difference between the air and lens 200's lens body 208. Therefore, an optical transmittance of high transmittance lens 400 can be greatly enhanced by transmittance enhancement layer 412 over the visible spectral range. In some embodiments, transmittance enhancement layer 412 can be configured to define an optical reflectivity from high transmittance lens 400's front surface 101 over the visible spectral range. For example, transmittance enhancement layer 412 can be an anti-reflection layer configured to reflect a portion of light across or over the visible spectral range. In some embodiments, transmittance enhancement layer 412 can be configured to reduce an optical reflectivity from high transmittance lens 400's front surface 101 across or over the visible spectral range. In some embodiments, an optical reflectivity from transmittance enhancement layer 412's surface 411 can be less than about 80%, less than about 60%, less than about 40%, less than about 20%, less than about 15%, less than about 10%, or less than about 5% across or over the visible spectral range. In some embodiments, transmittance enhancement layer 412 can be an anti-reflection layer configured to reflect a light in a portion of the visible spectral range, thus determining an overall color appearance of lenses 102A and 102B.

Transmittance enhancement layer 412 can be made of any suitable material that can increase optical transmittance, across or over the visible spectrum range, between high transmittance lens 400's front surface 101 and high transmittance lens 400's rear surface 103, as compared to an otherwise identical lens without transmittance layer 412. In some embodiments, transmittance enhancement layer 412 can include a magnesium fluoride layer. In some embodiments, transmittance enhancement layer 412 can include an oxide layer (e.g., silicon oxide or titanium oxide), an nitride layer (e.g., silicon nitride, or aluminum nitride) an oxynitride layer, a metallic layer, a polymer layer, or an organic layer. In some embodiments, transmittance enhancement layer 412 can be a multilayer stack that includes one or more of the above-noted materials. In some embodiments, transmittance enhancement layer 412 can have a refractive index smaller than lens body 208's refractive index. In some embodiments, transmittance enhancement layer 412 can have a refractive index substantially equal to a square root of lens body 208's refractive index. In some embodiments, transmittance enhancement layer 412 can include multiple layers that can form a refractive index profile continuously or discretely changing from 1.0 to lens 200's lens body 208's refractive index. In some embodiments, transmittance enhancement layer 412 can further increase VLT through lens 200 across or over the visible spectral range. For example, lens 200 can have VLT of about 88% across or over the visible spectral range, while transmittance enhancement layer 412 can be formed over lens 200 to further increase VLT to about 92% through lens 200 over the visible spectral range. In some embodiments, transmittance enhancement layer 412 can increase an optical transmittance through lens 200 across or over the visible spectral range. For example, transmittance enhancement layer 412 can enhance an optical transmittance through lens 200 by greater than about 0.5%, greater than about 1%, greater than about 2%, greater than about 3%, greater than about 4%, greater than about 5%, greater than about 6%, greater than about 8%, greater than about 10%, greater than about 15%, or greater than about 20% across or over the visible spectral range, when comparing with another lens 200 that does not have transmittance enhancement layer 412.

Anti-reflection layer 414 can be disposed over lens 200. For example, anti-reflection layer 414 can be disposed over lens 200's lens body 208's rear surface 209, and can be configured to reduce an optical reflectivity from high transmittance lens 400's rear surface 103 across or over the visible spectral range. For example, anti-reflection layer 414 can be configured to reflect a portion of light across or over the visible spectral range. In some embodiments, anti-reflection layer 414 can be configured to reflect a light in a portion of the visible spectral range, thus determining an overall color appearance of lenses 102A and 102B. In some embodiments, anti-reflection layer 414 can have an exposed surface 413, where surface 413 can represent high transmittance lens 400's rear surface 103. In some embodiments, anti-reflection layer 414 can include a magnesium fluoride layer. In some embodiments, anti-reflection layer 414 can include an oxide layer, an nitride layer, an oxynitride layer, a metallic layer, a polymer layer, or an organic layer. In some embodiments, anti-reflection layer 414 can be a multilayer stack that includes one or more of the above-noted materials. In some embodiments, anti-reflection layer 414 can have a refractive index between 1.0 (e.g., an air) and lens body 208's refractive index. In some embodiments, transmittance enhancement layer 412 and anti-reflection layer 414 can include identical material, or can have substantially identical refractive indexes to each other. In some embodiments, an optical reflectivity from anti-reflection layer 414's surface 413 can be less than about 80%, less than about 60%, less than about 40%, less than about 20%, less than about 15%, less than about 10%, or less than about 5% across or over the visible spectral range. In some embodiments, anti-reflection layer 414 in combination with transmittance enhancement layer 412 can increase an optical transmittance of a light transmitted through lens 200 over the visible spectral range. For example, lens 200 can have a VLT of about 88% over the visible spectral range, while transmittance enhancement layer 412 and anti-reflection layer 414 can be respectively formed on front surface 207 and rear surface 209 to further increase the VLT to about 92% through lens 200 over the visible spectral range.

As previously discussed, high transmittance lens 400 equipped with transmittance enhancement layer 412 has enhanced VLT and/or optical transmittance compared to lens 200. Such VLT enhancement and/or optical transmittance enhancement can provide a design margin to allow high transmittance lens 400 to further incorporate extra one or more functional layers without violating a transparency requirement or visibility requirement of eyewear 100. For example, high transmittance lens 400 can further include one or more functional layers (not shown in FIG. 4A), where the incorporation of transmittance enhancement layer 412 into high transmittance lens 400 can ensure that high transmittance lens 400 provides qualified visible transparency for eyewear 100 in a low illumination environment, such as in an indoor space or in a car. In some embodiments, the one or more functional layers (not shown in FIG. 4A) in high transmittance lens 400 can include an optical filter configured to provide an optical filtering, a polarizer configured to provide polarization, an electro-chromic layer configured to provide electrochromism, a reflection layer configured to provide a partial reflection of incoming visible light, an absorption layer configured to provide a partial or complete absorption of infrared light, a color enhancement layer, a color alteration layer, an anti-static functional layer, an anti-fog functional layer, a scratch resistance layer, a mechanical durability layer, a hydrophobic functional layer, a reflective functional layer, a darkening functional layer, an aesthetic functional layer including tinting, or any combination of these. In some embodiments, the one or more functional layers can further include a glue layer configured to provide adhesions between layers in high transmittance lens 400, a mechanical protection layer configured to provide mechanical protection to lenses 102A and 102B, to reduce stresses within high transmittance lens 400, or to improve bonding or adhesion among the layers in high transmittance lens 400. In some embodiments, the chroma enhancement filter can be at least partially incorporated into the one or more functional layers in high transmittance lens 400. In some embodiments, the one or more functional layers in high transmittance lens 400 can be impregnated with, loaded with, or otherwise include the chroma enhancement filters.

Figure 4B:
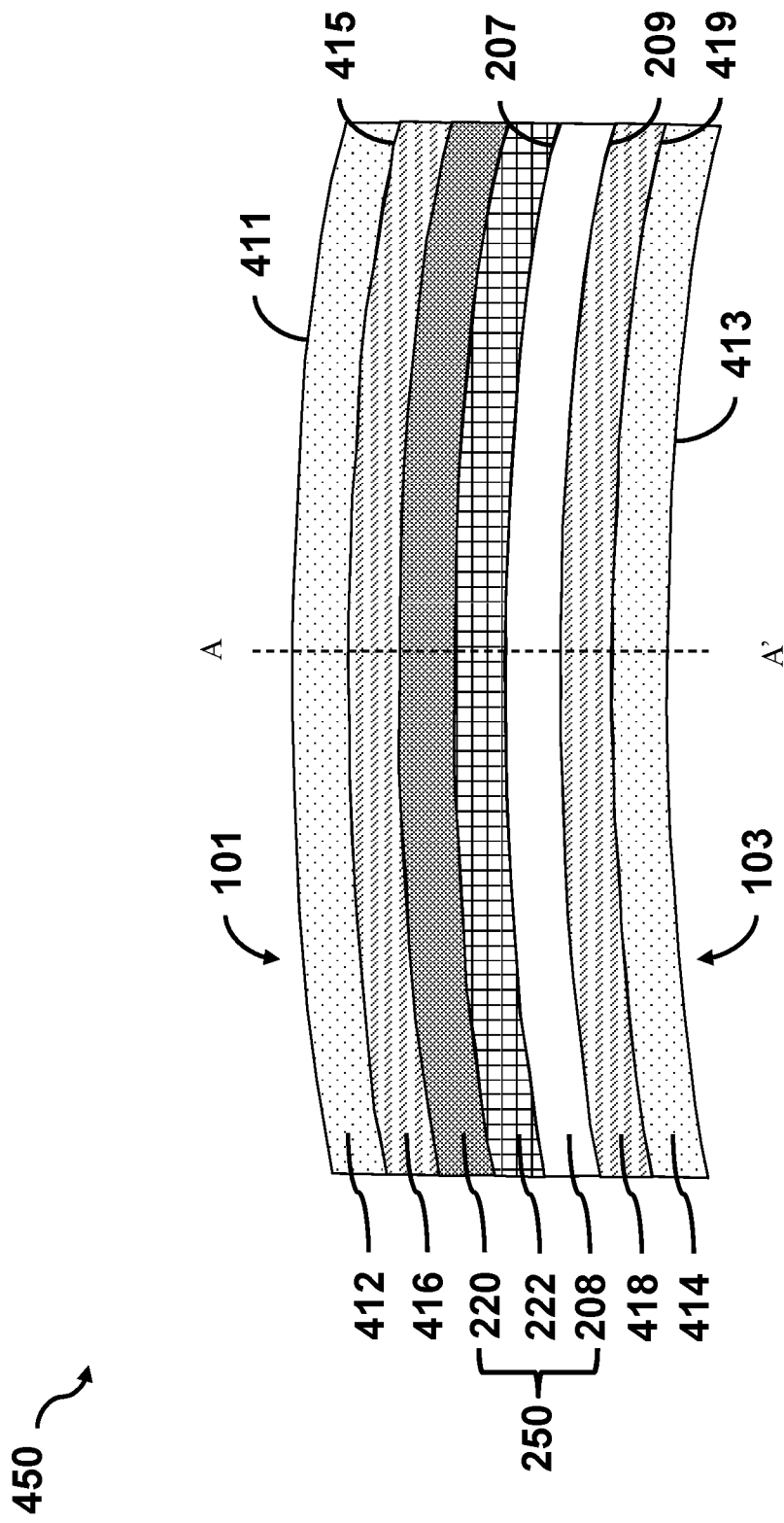
FIG. 4B illustrates a cross-sectional view of an optical filter, configured to provide chroma enhancement, of an eyewear, according to some embodiments.

FIG. 4B shows a cross-sectional view of high transmittance lens 450, according to some embodiments. High transmittance lens 450 can be an embodiment of lens 102 shown in FIG. 1, lens 200 shown in FIG. 2A, lens 250 shown in FIG. 2B, or high transmittance lens 400 shown in FIG. 4A. The discussion of lenses 102, 200, 250, and 400 applies to high transmittance lens 450, unless mentioned otherwise. Further, the discussion of elements with the same annotations in FIGS. 1, 2A, 2B, 4A and 4B applies to each other, unless mentioned otherwise. As shown in FIG. 4B, high transmittance lens 450 can include lens 250 that can include lens body 208 and chroma enhancement layer 222 coupled to lens body 208, a hard coat layer 416 disposed over lens body 208's front surface 207, and a hard coat layer 418 disposed over lens body 208's rear surface 209. Further, high transmittance lens 450 can also include transmittance enhancement layer 412 disposed over hard coat layer 416 (e.g., transmittance enhancement layer 412 is disposed close to front surface 101.) In some embodiments, as shown in FIG. 4B, high transmittance lens 450 can further include an anti-reflection layer 414. In some embodiments (not shown in FIG. 4B), high transmittance lens 450 can further include another transmittance enhancement layer 412 disposed over hard coat layer 418 (e.g., transmittance enhancement layer 412 is disposed close to rear surface 103). In some embodiments, high transmittance lens 450 can further include variable transmission layer 220 disposed over lens body 208. In some embodiments, high transmittance lens 450 can have a VLT between about 55% and about 95%, between about 60% and about 92%, or between about 65% and about 90%.

Hard coat layers 416 and 418 can include a polymer material, such as a polymeric material, configured to increase an abrasion resistance, a mechanical durability, and/or chemical resistance of high transmittance lens 400. Hard coat layer 416 can be disposed over lens body 208's front surface 207, and can have a surface 415 facing outwards (e.g., away from eyewear 100's wearer). Hard coat layer 418 can be disposed over lens body 208's rear surface 209, and can have a surface 419 facing inwards (e.g., towards eyewear 100's wearer). In some embodiments, hard coat layer 416 and/or hard coat layer 418 can be disposed over chroma enhancement layer 222. In some embodiments, hard coat layer 416 and/or hard coat layer 418 can be disposed over variable transmission layer 220. As a result, hard coat layers 416 and 418 can protect lens body 208, variable transmission layer 220, and/or chroma enhancement layer 222 from being damaged (e.g., scratched), thus avoiding degrading lenses 102A and 102B. In some embodiments, hard coat layer 416 and/or hard coat layer 418 can have an optical transmittance greater than about 75%, greater than about 80%, greater than about 85%, or greater than about 90% in the visible spectral range. In some embodiments, hard coat layer 416 and/or hard coat layer 418 can have a substantially uniform optical transmittance in the visible spectral range. For example, hard coat layer 416 and/or hard coat layer 418 can have an optical transmittance between 85% and 90% in the visible spectral range. In some embodiments, hard coat layers 416 and 418 can have substantially identical material and/or thickness to each other. In some embodiments, the chroma enhancement filter can be at least partially incorporated into hard coat layer 416 and/or hard coat layer 418. In some embodiments, hard coat layer 416 and/or hard coat layer 418 can be impregnated with, loaded with, or otherwise include the chroma enhancement filters.

Transmittance enhancement layer 412 can be configured to increase an overall optical transmittance from high transmittance lens 450's front surface 101 to high transmittance lens 450's rear surface 103. In some embodiments, an optical transmittance enhancement provided by transmittance enhancement layer 412 can be wavelength insensitive across or over the visible spectral range. For example, in some embodiments, the difference between optical transmittance enhancements, provided by transmittance enhancement layer 412, at two different wavelengths within the visible spectral range can be less than about 0.1%, less than about 0.3%, less than about 0.5%, less than about 0.7%, less than about 1%, less than about 2%, less than about 3%, or less than about 5%, where the two different wavelengths can be separated from each other by greater than about 1 nm, greater than about 2 nm, greater than about 5 nm, greater than about 10 nm, greater than about 20 nm, greater than about 50 nm, greater than about 100 nm, or greater than about 200 nm. As shown in FIG. 4B, transmittance enhancement layer 412 can be disposed over hard coat layer 416's outward surface 415. In some embodiments, transmittance enhancement layer 412 can physically contact lens body 208, chroma enhancement layer 222, variable transmission layer 220, or hard coat layer 416.

As discussed previously, transmittance enhancement layer 412 can have a refractive index between air's refractive index and its underlying substrate's refractive index to enhance an optical transmittance for a visible light transmitting through high transmittance lens 450. For example, transmittance enhancement layer 412 can have a refractive index between 1.0 (e.g., the refractive index of air) and lens body 208's refractive index, between 1.0 and chroma enhancement layer 222's refractive index, between 1.0 and hard coat layer 416's refractive index, and/or between 1.0 and hard coat layer 418's refractive index. In some embodiments, transmittance enhancement layer 412 can have a refractive index equal to about a square root of lens body 208's refractive index, about a square root of chroma enhancement layer 222's refractive index, about a square root of hard coat layer 416's refractive index, or about a square root of hard coat layer 418's refractive index. In some embodiments, transmittance enhancement layer 412 can include one or more layers, where each of the one or more layers can have a refractive index smaller than chroma enhancement layer 222's refractive index, hard coat layer 416's refractive index, and/or hard coat layer 418's refractive index. In some embodiments, transmittance enhancement layer 412 can include multiple layers that can form a refractive index profile continuously or discretely changing from 1.0 to lens body 208's refractive index, chroma enhancement layer 222's refractive index, hard coat layer 416's refractive index, and/or hard coat layer 418's refractive index.

In some embodiments, transmittance enhancement layer 412 can increase through its underlying one or more layers an optical transmittance of a light across or over the visible spectral range. For example, lens body 208 in combination with chroma enhancement layer 222 and hard coat layers 416 and 418 can have a VLT of about 88% over the visible spectral range, while transmittance enhancement layer 412 can be formed over lens body 208 to further increase the VLT to about 92% through the combination of lens body 208, chroma enhancement layer 222, and hard coat layers 416 and 418 over the visible spectral range. In some embodiments, an optical transmittance of high transmittance lens 450 that includes transmittance enhancement layer 412 can be greater than another optical transmittance of a counterpart lens 450 that does not include transmittance enhancement layer 412, by more than about 0.5%, more than about 1%, more than about 2%, more than about 3%, more than about 4%, more than about 5%, more than about 6%, more than about 8%, more than 10%, more than 15%, or more than 20% across or over the visible spectral range. In some embodiments, a VLT of high transmittance lens 450 that includes transmittance enhancement layer 412 can be greater than another VLT of a counterpart high transmittance lens 450 that does not include transmittance enhancement layer 412, by more than about 0.5%, more than about 1%, more than about 2%, more than about 3%, more than about 4%, more than about 5%, more than about 6%, more than about 8%, more than 10%, more than 15%, or more than 20% across or over the visible spectral range. In some embodiments, an optical reflectivity from transmittance enhancement layer 412's surface 411 can be less than about 80%, less than about 60%, less than about 40%, less than about 20%, less than about 15%, less than about 10%, or less than about 5% across or over the visible spectral range.

Anti-reflection layer 414 can be disposed over high transmittance lens 450's rear surface 103, and can be configured to reduce an optical reflectivity from rear surface 103 across or over the visible spectral range. As shown in FIG. 4B, anti-reflection layer 414 can be disposed over hard coat layer 418's inward surface 419. In some embodiments, anti-reflection layer 414 can have an exposed surface 413 representing high transmittance lens 450's rear surface 103. Anti-reflection layer 414 can include one or more layers that can each have a refractive index between 1.0 (e.g., the refractive index of air) and lens body 208's refractive index, between 1.0 and chroma enhancement layer 222's refractive index, between 1.0 and hard coat layer 416's refractive index, and/or between 1.0 and hard coat layer 418's refractive index. In some embodiments, transmittance enhancement layer 412 and anti-reflection layer 414 can include identical material or have substantially identical refractive indexes. In some embodiments, an optical reflectivity from anti-reflection layer 414's surface 413 can be less than about 80%, less than about 60%, less than about 40%, less than about 20%, less than about 15%, less than about 10%, or less than about 5% across or over the visible spectral range. In some embodiments, anti-reflection layer 414 in combination with transmittance enhancement layer 412 can increase an optical transmittance through one or more layers sandwiched between anti-reflection layer 414 and transmittance enhancement layer 412 across or over the visible spectral range. For example, as shown in FIG. 4B, a combination of lens body 208, chroma enhancement layer 222, and hard coat layers 416 and 418 can have VLT of about 88% across or over the visible spectral range. Such combination of lens body 208, chroma enhancement layer 222, and hard coat layers 416 and 418 can be sandwiched by anti-reflection layer 414 and transmittance enhancement layer 412 to further increase its VLT to about 92% over the visible spectral range.

As discussed above, transmittance enhancement layer 412 and/or anti-reflection layer 414 can increase the optical transmittance for high transmittance lens 450. Similar to high transmittance lens 400, this optical transmittance increase can provide a design margin to allow high transmittance lens 450 to incorporate additional functional layers without violating a transparency requirement or visibility requirement of eyewear 100. In some embodiments, high transmittance lens 450 can further include one or more functional layer (not shown in FIG. 4B), such as an optical filter configured to provide optical filtering, a polarizer configured to provide polarization, an electro-chromic layer configured to provide electrochromism, a reflection layer configured to provide a partial reflection of incoming visible light, an absorption layer configured to provide a partial or complete absorption of infrared light, a color enhancement layer, a color alteration layer, an anti-static functional layer, an anti-fog functional layer, a scratch resistance layer, a mechanical durability layer, a hydrophobic functional layer, a reflective functional layer, a darkening functional layer, an aesthetic functional layer including tinting, a glue layer, a mechanical protection layer configured to provide mechanical protection to lenses 102A and 102B, to reduce stresses within high transmittance lens 450, or to improve bonding or adhesion among the layers in high transmittance lens 450, a physical vapor deposition (PVD) layer, or any combination of these. In some embodiments, the chroma enhancement filter can be at least partially incorporated into the one or more functional layers in high transmittance lens 450. In some embodiments, the one or more functional layer in high transmittance lens 450 can be impregnated with, loaded with, or otherwise include the chroma enhancement filters.

Figure 5A:
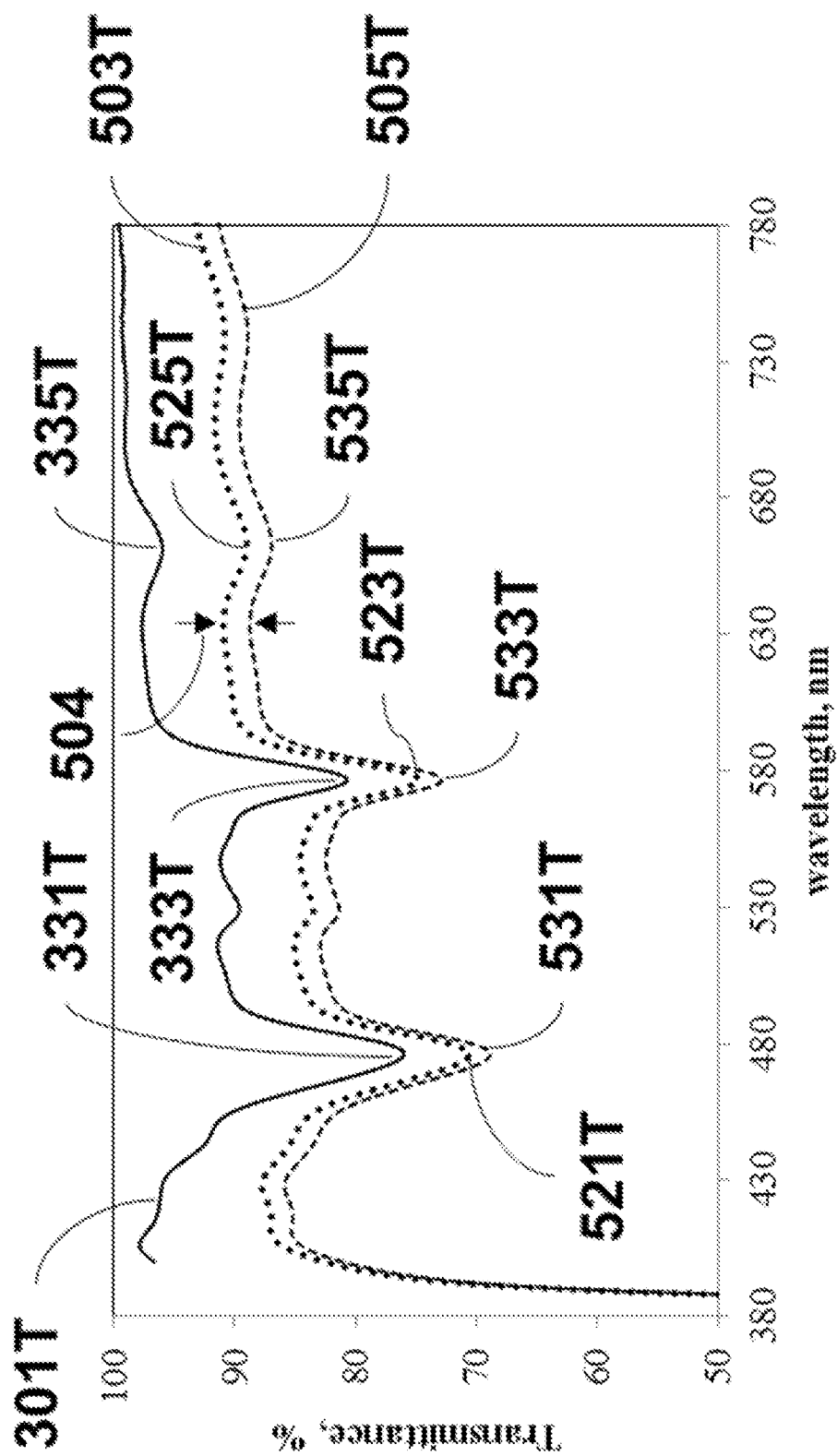
FIGS. 5A-5E show optical characteristics of various optical filters, each configured to provide chroma enhancement, for an eyewear, according to some embodiments.
Figure 5B:
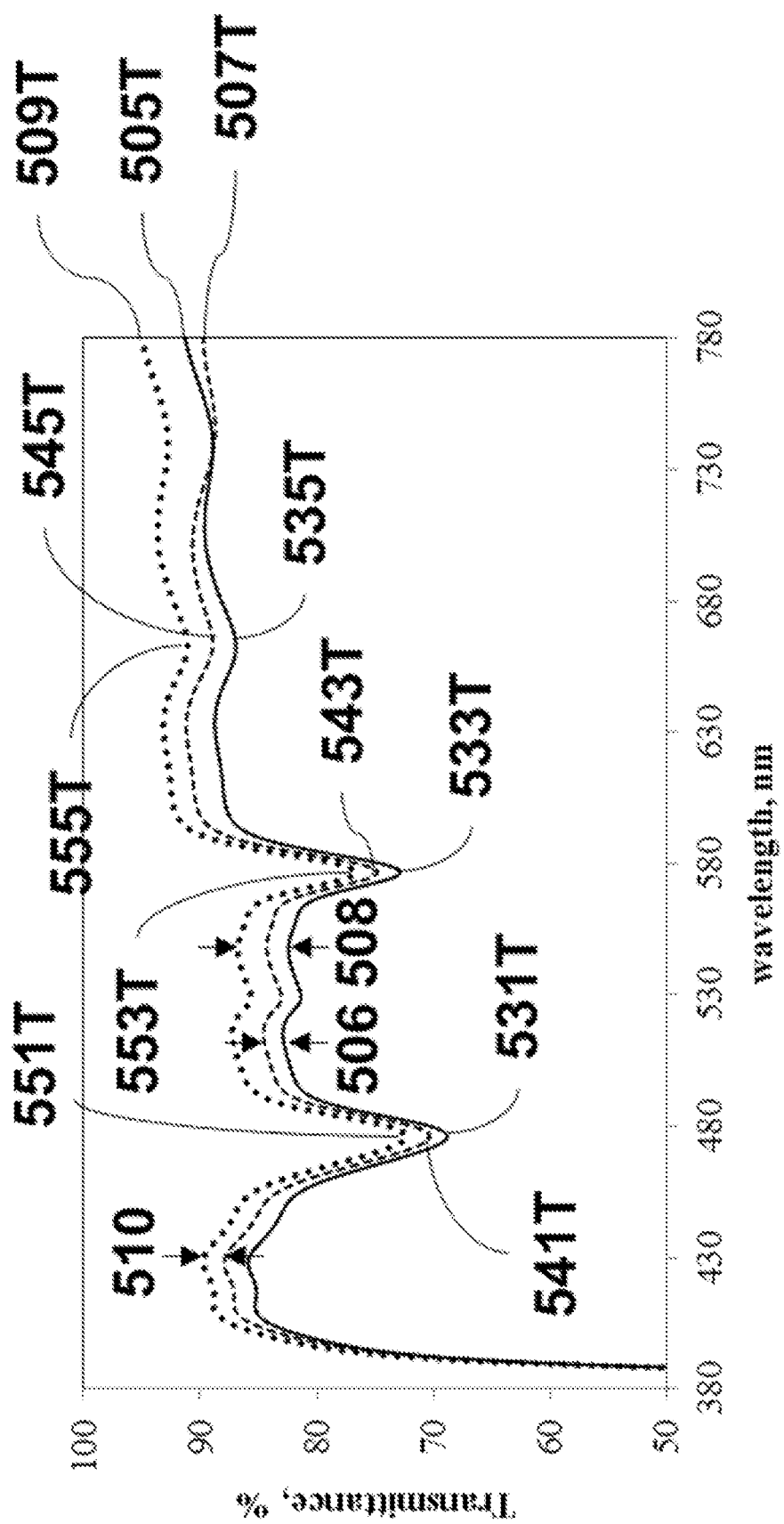
Figure 5C:
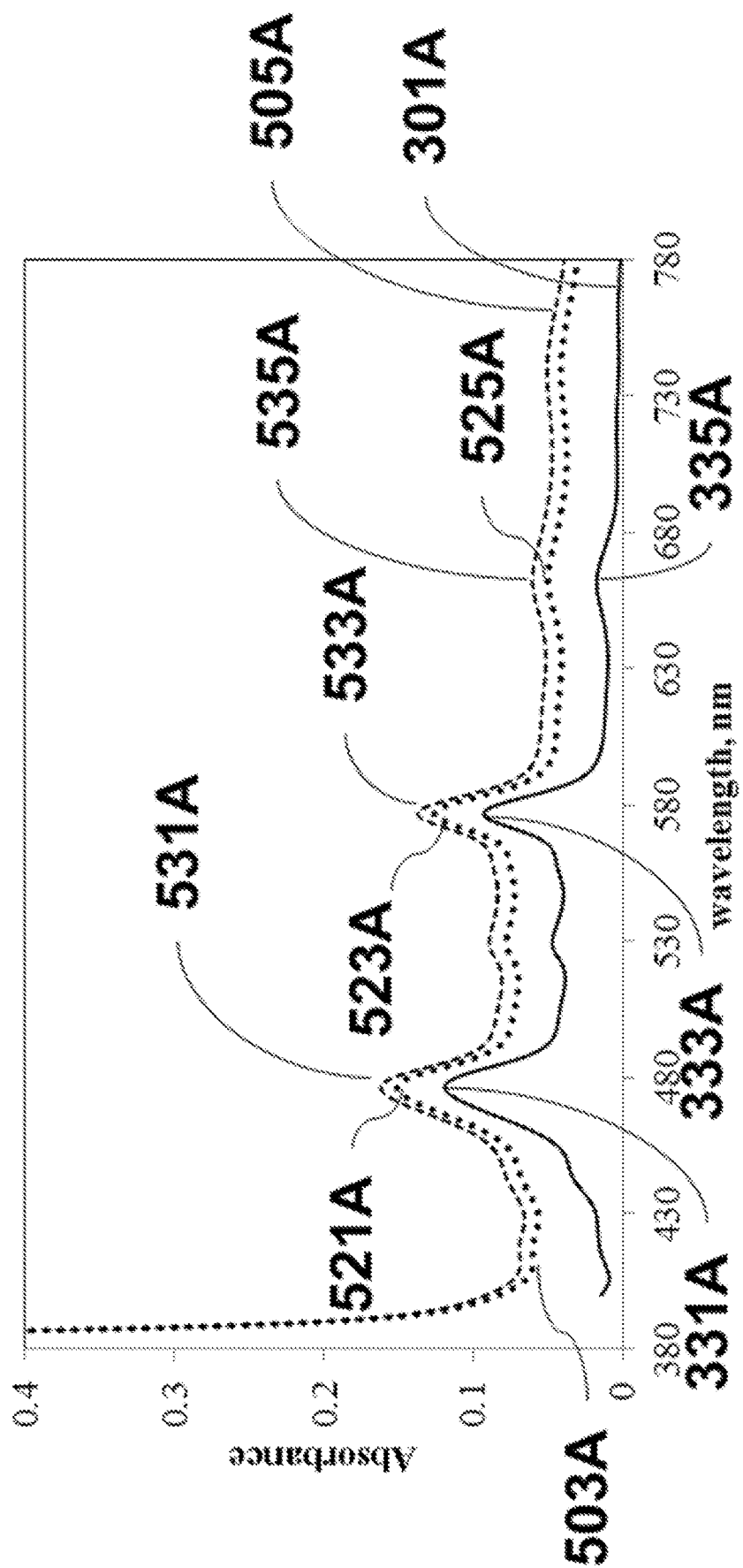
Figure 5D:
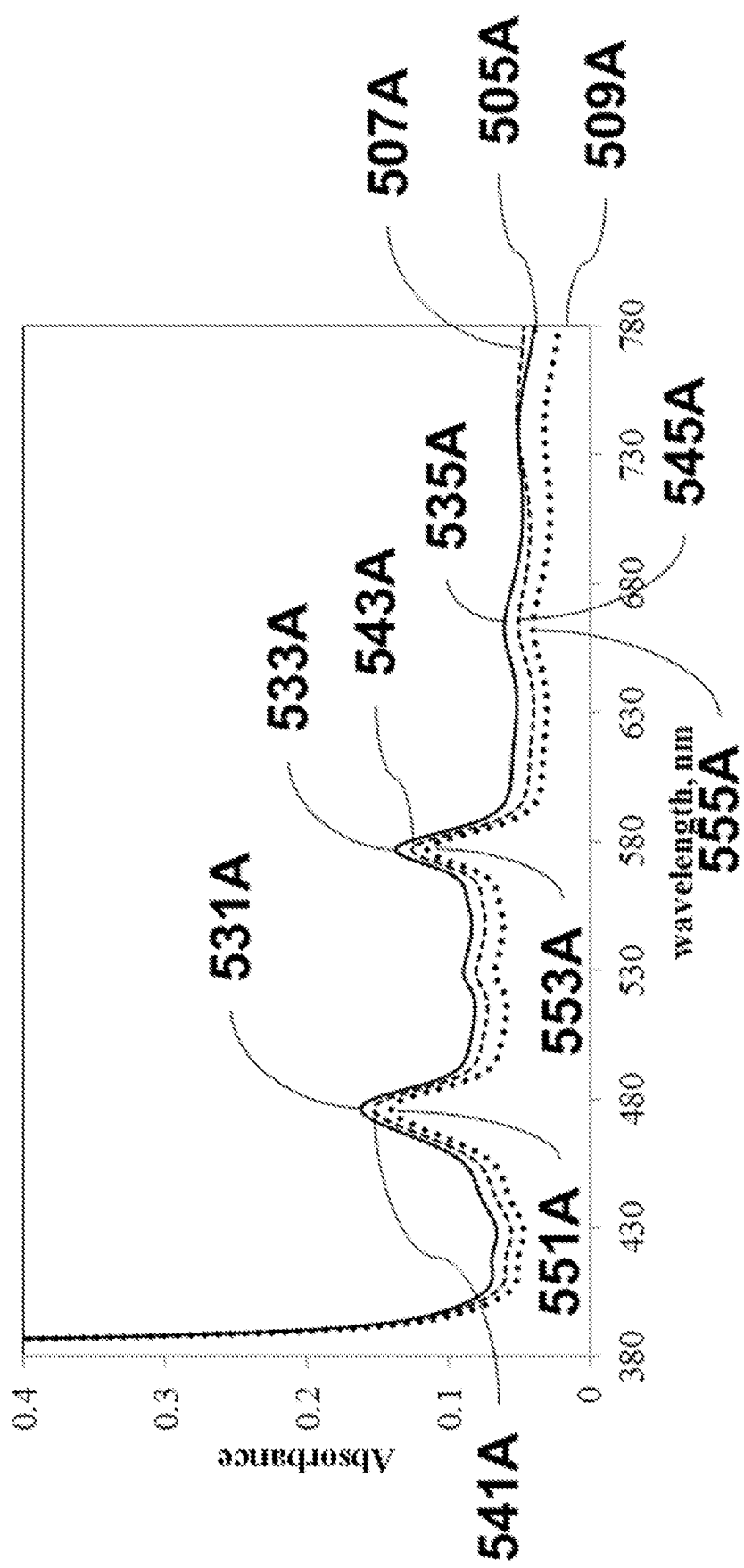

FIGS. 5A and 5B illustrate optical transmittance profiles 301T, 503T, 505T, 507T, and 509T, according to some embodiments. FIGS. 5C and 5D illustrate optical absorbance profiles 301A, 503A, 505A, 507A, and 509A, respectively associated with optical transmittance profiles 301T, 503T, 505T, 507T, and 509T, according to some embodiments. It would be understood that transmittance values and absorbance values exhibited in FIGS. 5A-5D are merely illustrative and not intended to be limiting, unless mentioned otherwise. The discussion herein of elements with the same reference numbers in FIGS. 3A, 3B, 5A-5D applies to identically numbered elements in other figures, unless mentioned otherwise.

Referring to FIGS. 5A and 5B, optical transmittance profiles 503T, 505T, 507T, and 509T can represent optical transmittance of various embodiments of eyewear 100's lens 102A and/or lens 102B. For example, optical transmittance profile 503T can represent an optical transmittance of high transmittance lens 400 or high transmittance lens 450 that includes transmittance enhancement layer 412 disposed close to front surface 101. Optical transmittance profile 505T can represent an optical transmittance of high transmittance lens 400 or high transmittance lens 450 that excludes both transmittance enhancement layer 412 and anti-reflection layer 414. Optical transmittance profile 507T can represent an optical transmittance of high transmittance lens 400 or high transmittance lens 450 that includes transmittance enhancement layer 412 close to front surface 101 and anti-reflection layer 414 close to rear surface 103. Optical transmittance profile 509T can represent an optical transmittance of high transmittance lens 400 or high transmittance lens 450 that includes one transmittance enhancement layer 412 close to front surface 101 and another transmittance enhancement layer 412 close to rear surface 103.

As shown in FIGS. 5A and 5B, each of optical transmittance profiles 503T, 505T, 507T, and 509T can have an optical transmittance greater than about 65% across the wavelength range between about 400 nm and about 780 nm. In some embodiments, each of optical transmittance profiles 503T, 505T, 507T, and 509T can have an optical transmittance greater than about 50%, greater than about 60%, or greater than about 70% across the wavelength range between about 400 nm and about 780 nm. In some embodiments, each of optical transmittance profiles 503T, 505T, 507T, and 509T can be associated with VLT greater than about 55%, greater than about 70%, greater than about 75%, greater than about 80%, greater than about 85%, or greater than about 90%. In some embodiments, each of optical transmittance profiles 503T, 505T, 507T, and 509T can be associated with VLT between about 55% and about 95%, between about 60% and about 92%, or between about 65% and about 90%. In some embodiments, portions of each optical transmittance profiles 503T, 505T, 507T, and 509T can have an optical transmittance below 50% over the wavelength range between about 400 nm and about 780 nm, while each of optical transmittance profiles 503T, 505T, 507T, and 509T can be associated a high VLT to provide a high transparency. For example, each of optical transmittance profiles 503T, 505T, 507T, and 509T can have a minimum optical transmittance between about 0% and about 50%, between about 10% and about 50%, between about 20% and about 50%, between about 30% and about 50%, or between about 40% and about 50% over the wavelength range between about 400 nm and about 780 nm, where each of optical transmittance profiles 503T, 505T, 507T, and 509T can be associated with VLT greater than about 55%, greater than about 70%, greater than about 75%, greater than about 80%, greater than about 85%, greater than about 90%, between about 55% and about 95%, between about 60% and about 92%, or between about 65% and about 90%.

Further, as previously discussed, transmittance enhancement layer 412 and/or anti-reflection layer 414 can increase an optical transmittance through high transmittance lens 400 across or over the visible spectral range in a wavelength-insensitive manner. As a result, as shown in FIGS. 5A and 5B, optical transmittance profiles 503T, 505T, 507T, and 509T can have substantially constant transmittance differences across or over the wavelengths of the visible spectral range, or within a wavelength range between about 400 nm and about 700 nm. In some embodiments, optical transmittance profile 503T can have a higher optical transmittance than optical transmittance profile 505T across or over the visible spectral range or within a wavelength range between about 400 nm and about 700 nm. For example, an optical transmittance difference 504, shown by the two opposing arrows in FIG. 5A, between optical transmittance profile 505T and optical transmittance profile 503T, can be between about 0.1% and about 15%, between about 0.5% and about 10%, between about 1% and about 10%, between about 2% and about 10%, between about 2% and about 8%, or between about 3% and about 7% across or over the visible spectral range or within the wavelength range between about 400 nm and about 700 nm. In some embodiments, a difference between the average optical transmittances of optical transmittance profiles 503T and 505T can be substantially equal to optical transmittance difference 504. In some embodiments, optical transmittance profile 507T can have a higher optical transmittance than optical transmittance profile 505T across or over the visible spectral range or within a wavelength range between about 400 nm and about 700 nm. For example, an optical transmittance difference 506, shown by the two opposing arrows in FIG. 5B, between optical transmittance profile 505T and optical transmittance profile 507T can be between about 0.1% and about 15%, between about 0.5% and about 10%, between about 1% and about 10%, between about 2% and about 10%, between about 2% and about 8%, or between about 3% and about 7% across or over the visible spectral range or within the wavelength range between about 400 nm and about 700 nm. In some embodiments, a difference between the average optical transmittances of optical transmittance profiles 507T and 505T can be substantially equal to optical transmittance difference 506. In some embodiments, optical transmittance difference 506 can be greater than optical transmittance difference 504.

In some embodiments, optical transmittance profile 509T can have higher optical transmittance than optical transmittance profile 505T across or over the visible spectral range or within a wavelength range between about 400 nm and about 700 nm. For example, an optical transmittance difference 508, shown by the two opposing arrows in FIG. 5B, between optical transmittance profile 505T and optical transmittance profile 509T can be between about 0.1% and about 15%, between about 0.5% and about 10%, between about 1% and about 10%, between about 2% and about 10%, between about 2% and about 8%, or between about 3% and about 7% across or over the visible spectral range or within the wavelength range between about 400 nm and about 700 nm. In some embodiments, a difference between the average optical transmittances of optical transmittance profiles 509T and 505T can be substantially equal to optical transmittance difference 508. In some embodiments, optical transmittance difference 508 can be greater than optical transmittance difference 504 and/or optical transmittance difference 506. In some embodiments, optical transmittance profile 509T can have a higher optical transmittance than optical transmittance profile 507T across or over the visible spectral range or within a wavelength range between about 400 nm and about 700 nm. For example, an optical transmittance difference 510, shown by the two opposing arrows in FIG. 5B, between optical transmittance profile 507T and optical transmittance profile 509T can be between about 0.1% and about 15%, between about 0.5% and about 10%, between about 1% and about 10%, between about 2% and about 10%, between about 2% and about 8%, or between about 3% and about 7% across or over the visible spectral range or within the wavelength range between about 400 nm and about 700 nm.

In some embodiments, optical transmittance profile 503T can have a respective VLT greater than optical transmittance profile 505T's VLT by between about 0.1% and about 10%, between about 0.5% and about 10%, between about 1% and about 10%, between about 2% and about 10%, between about 2% and about 8%, or between about 3% and about 7%. In some embodiments, optical transmittance profile 509T can have a respective VLT greater than optical transmittance profile 505T's VLT by between about 0.1% and about 10%, between about 0.5% and about 10%, between about 1% and about 10%, between about 2% and about 10%, between about 2% and about 8%, or between about 3% and about 7%. In some embodiments, the difference between optical transmittance profile 509T's VLT and optical transmittance profile 505T's VLT can be greater than the difference between optical transmittance profile 503T's VLT and optical transmittance profile 505T's VLT.

In some embodiments, a difference between the average optical transmittances of optical transmittance profiles 509T and 505T can be between about 0.1% and about 15%, between about 0.5% and about 10%, between about 1% and about 10%, between about 2% and about 10%, between about 2% and about 8%, or between about 3% and about 7% in the wavelength ranges between about 400 nm and about 780 nm.

As previously discussed, an optical transmittance can be associated with a respective optical absorbance. As such, each transmission valley in optical transmittance profiles 503T, 505T, 507T, and 509T can be associated with a corresponding absorbance peak in optical absorbance profiles 301A, 503A, 505A, 507A, and 509A, respectively. Namely, referring to FIGS. 5A-5D, optical transmittance profile 503T can include transmittance valleys 521T, 523T, and 525T respectively associated with absorbance peaks 521A, 523A, and 525A in optical absorbance profile 503A. Optical transmittance profile 505T can include transmittance valleys 531T, 533T, and 535T respectively associated with absorbance peaks 531A, 533A, and 535A in optical absorbance profile 505A. Similarly, optical transmittance profile 507T can include transmittance valleys 541T, 543T, and 545T respectively associated with absorbance peaks 541A, 543A, and 545A in optical absorbance profile 507A. Optical transmittance profile 509T can include transmittance valleys 551T, 553T, and 555T respectively associated with absorbance peaks 551A, 553A, and 555A in optical absorbance profile 509A. In some embodiments, each of optical transmittance valleys 521T, 523T, 525T, 531T, 533T, 535T, 541T, 543T, 545T, 551T, 553T and 555T can be positioned in a substantially identical spectral range as the respective absorbance peaks 521A, 523A, 525A, 531A, 533A, 535A, 541A, 543A, 545A, 551A, 553A and 555A.

As shown in FIGS. 5C and 5D, the absorbance peak positions of optical absorbance profiles 503A, 505A, 507A, and 509A can be dominated by chroma enhancement layer 222 and/or lens body 208 that incorporates chroma enhancement filters. For example, spectral positions of each of absorbance peaks 521A, 531A, 541A, and 551A can be substantially equal to the position of absorbance peak 331A. Similarly, spectral positions of each of absorbance peaks 523A, 533A, 543A, and 553A can be substantially equal to the position of absorbance peak 333A. Spectral positions of each of absorbance peaks 525A, 535A, 545A, and 555A can be substantially equal to the position of absorbance peak 335A.

As shown in FIGS. 5C and 5D, each of absorbance peaks 521A, 531A, 541A, and 551A can have a maximum optical density between about 0.05 and about 0.35. In some embodiments, each of absorbance peaks 521A, 531A, 541A, and 551A can have a maximum optical density between about 0.35 and about 0.7, between about 0.35 and about 0.6, between about 0.35 and about 0.5, or between about 0.35 and about 0.4, where the respective optical transmittance profiles 503T, 505T, 507T, and 509T can each be associated with VLT greater than about 55%, greater than about 70%, greater than about 75%, greater than about 80%, greater than 85%, greater than about 90%, between about 55% and about 95%, between about 60% and about 92%, or between about 65% and about 90%. In some embodiments, the maximum optical density of each of absorbance peaks 521A, 531A, 541A, and 551A can be positioned in a spectral band between about 440 nm and about 520 nm, between about 450 nm and about 510 nm, or between about 460 nm and about 500 nm. Accordingly, optical densities at a lower edge portion (e.g., closer to about 450 nm) and a upper edge portion (e.g., close to about 500 nm) of the spectral band can be less than that of each of absorbance peaks 521A, 531A, 541A, and 551A. Namely, each of absorbance peaks 521A, 531A, 541A, and 551A can have greater absorbance than the lower edge and the upper edge portions of the spectral band. Similarly, as shown in FIGS. 5C and 5D, each of absorbance peaks 523A, 533A, 543A, and 553A can have a maximum optical density between about 0.07 and about 0.3. In some embodiments, each of absorbance peaks 523A, 533A, 543A, and 553A can have a maximum optical density between about 0.3 and about 0.7, between about 0.3 and about 0.6, between about 0.3 and about 0.5, or between about 0.3 and about 0.4, where the respective optical transmittance profiles 503T, 505T, 507T, and 509T can each be associated with VLT greater than about 55%, greater than about 70%, greater than about 75%, greater than about 80%, greater than 85%, greater than about 90%, between about 55% and about 95%, between about 60% and about 92%, or between about 65% and about 90%.

In some embodiments, the maximum optical density of each of absorbance peaks 523A, 533A, 543A, and 553A can be positioned in a spectral band between about 540 nm and about 620 nm, between about 550 nm and about 600 nm, or between about 570 nm and about 590 nm. As shown in FIGS. 5C and 5D, each of absorbance peaks 525A, 535A, 545A, and 555A can have a maximum optical density between about 0.0 and about 0.1. In some embodiments, each of absorbance peaks 525A, 535A, 545A, and 555A can have a maximum optical density between about 0.1 and about 0.4, between about 0.1 and about 0.3, or between about 0.1 and about 0.2, where the respective optical transmittance profiles 503T, 505T, 507T, and 509T can each be associated with VLT greater than about 55%, greater than about 70%, greater than about 75%, greater than about 80%, greater than about 85%, greater than about 90%, between about 55% and about 95%, between about 60% and about 92%, or between about 65% and about 90%. In some embodiments, the maximum optical density of each of absorbance peaks 525A, 535A, 545A, and 555A can be positioned in a spectral band between about 630 nm and about 690 nm, or between about 640 nm or about 680 nm. In some embodiments, each of optical absorbance profiles 503A, 505A, 507A, and 509A can have an optical density between about 0.1 and 0.3 in a spectral band between about 380 nm and about 400 nm.

In some embodiments, each of absorbance peaks 521A, 523A, 525A, 531A, 533A, 535A, 541A, 543A, 545A, 551A, 553A and 555A can be associated with respective optical transmittance valleys 521T, 523T, 525T, 531T, 533T, 535T, 541T, 543T, 545T, 551T, 553T and 555T, where each of optical transmittance valleys 521T, 523T, 525T, 531T, 533T, 535T, 541T, 543T, 545T, 551T, 553T and 555T can have a minimum optical transmittance greater than about 50%, greater than about 60%, greater than about 70%, or greater than about 80%. In some embodiments, each of optical transmittance valleys 521T, 523T, 525T, 531T, 533T, 535T, 541T, 543T, 545T, 551T, 553T and 555T can have a minimum optical transmittance between about 0% and about 50%, between about 10% and about 50%, between about 20% and about 50%, between about 30% and about 50%, or between about 40% and about 50%, where the respective optical transmittance profiles 503T, 505T, 507T, and 509T can each be associated with VLT greater than about 55%, greater than about 70%, greater than about 75%, greater than about 80%, greater than about 85%, greater than about 90%, between about 55% and about 95%, between about 60% and about 92%, or between about 65% and about 90%. In some embodiments, a maximum optical density $A_v$ of each absorbance peaks 521A, 523A, 525A, 531A, 533A, 535A, 541A, 543A, 545A, 551A, 553A and 555A can be respectively associated with a minimum optical transmittance $T_{min}$ of each optical transmittance valleys 521T, 523T, 525T, 531T, 533T, 535T, 541T, 543T, 545T, 551T, 553T and 555T, where maximum optical density $A_v$ can be about equal to the logarithm of the magnitude of minimum optical transmittance $T_{min}$ (e.g., $A_v$ can be about equal to $-\log_{10}(|T_{min}|)$).

Each absorbance peak in optical absorbance profiles 503A, 505A, 507A, and 509A can have a respective absorbance bandwidth defined as a full width of the absorbance peak at 80% of the maximum absorbance of the absorbance peak, 90% of the maximum absorbance of the absorbance peak, or 95% of the maximum absorbance of the absorbance peak. In some embodiments, each of absorbance peaks 521A, 531A, 541A, and 551A can have an absorbance bandwidth less than about 50 nm, less than about 40 nm, less than about 30 nm, less than about 20 nm, less than about 15 nm, less than about 10 nm, or less than about 5 nm. In some embodiments, each of absorbance peaks 523A, 533A, 543A, and 553A can have an absorbance bandwidth less than about 50 nm, less than about 40 nm, less than about 30 nm, less than about 20 nm, less than about 15 nm, less than about 10 nm, or less than about 5 nm. In some embodiments, each of absorbance peaks 525A, 535A, 545A, and 555A can have an absorbance bandwidth less than about 50 nm, less than about 40 nm, less than about 30 nm, less than about 20 nm, less than about 15 nm, less than about 10 nm, or less than about 5 nm.

Each absorbance peak in optical absorbance profile 503A, 505A, 507A, and 509A can be associated with an absorption peak (not shown in FIGS. 5A-5D) having a maximum absorptance in the respective one or more spectral bands. The spectral bandwidth of the absorptance peak can be defined as a full width of the absorptance peak at 80% of the maximum absorptance of the absorptance peak, 90% of the maximum absorptance of the absorptance peak, or 95% of the maximum absorptance of the absorptance peak. An attenuation factor of each absorbance peak in optical absorbance profiles 503A, 505A, 507A, and 509A can be obtained by dividing an integration of the respective absorptance peak's area within the spectral bandwidth by the absorbance bandwidth of the each absorbance peak. In some embodiments, the attenuation factor associated with each of absorbance peaks 521A, 531A, 541A, and 551A can range from about 0.03 to about 0.8, from about 0.03 to about 0.75, from about 0.03 to about 0.65, from about 0.03 to about 0.55, from about 0.03 to about 0.45, from about 0.03 to about 0.35, from about 0.03 to about 0.3, from about 0.03 to about 0.25, from about 0.03 to about 0.2, from about 0.03 to about 0.15, or from about 0.03 to about 0.1. In some embodiments, the attenuation factor associated with each of absorbance peaks 523A, 533A, 543A, and 553A can range from about 0.03 to about 0.8, from about 0.03 to about 0.75, from about 0.03 to about 0.65, from about 0.03 to about 0.55, from about 0.03 to about 0.45, from about 0.03 to about 0.3, from about 0.03 to about 0.25, from about 0.03 to about 0.2, from about 0.03 to about 0.15, or from about 0.03 to about 0.1. In some embodiments, the attenuation factor associated with each of absorbance peaks 525A, 535A, 545A, and 555A can range from about 0.03 to about 0.3, from about 0.03 to about 0.25, from about 0.03 to about 0.2, from about 0.03 to about 0.15, or from about 0.03 to about 0.1.

Each optical transmittance valley in each of optical transmittance profiles 503T, 505T, 507T, and 509T can have a respective transmittance bandwidth defined as a full width of the each optical transmittance valley at certain offset from the minimum optical transmittance of the each optical transmittance valley, such as the minimum optical transmittance plus 1%, the minimum optical transmittance plus 2%, the minimum optical transmittance plus 5%, the minimum optical transmittance plus 10%, or the minimum optical transmittance plus 20%. In some embodiments, each of optical transmittance valleys 521T, 523T, 525T, 531T, 533T, 535T, 541T, 543T, 545T, 551T, 553T and 555T can have an optical transmittance bandwidth of less than about 50 nm, less than about 40 nm, less than about 30 nm, less than about 20 nm, less than about 15 nm, less than about 10 nm, or less than about 5 nm.

As previously discussed, an optical transmittance valley can include a middle spectral portion accommodating a minimum optical transmittance. The optical transmittance valley can further include a lower and an upper spectral portions that have an optical transmittance substantially greater than the minimum optical transmittance. In some embodiments, the minimum optical transmittance each of optical transmittance valleys 521T, 523T, 525T, 531T, 533T, 535T, 541T, 543T, 545T, 551T, 553T and 555T can be about 5% lower, about 10% lower, about 20% lower, about 30% lower, about 40% lower, or about 50% lower, as compared to a maximum optical transmittance of the upper or lower spectral portions of the each of optical transmittance valleys 521T, 523T, 525T, 531T, 533T, 535T, 541T, 543T, 545T, 551T, 553T and 555T. In some embodiments, the minimum optical transmittance of each optical transmittance valleys 521T, 523T, 525T, 531T, 533T, 535T, 541T, 543T, 545T, 551T, 553T and 555T can be from about 5% lower to about 50% lower, from about 5% lower to about 40% lower, from about 5% lower to about 30% lower, from about 5% lower to about 20% lower, or from about 5% lower to about 10% lower, as compared to a maximum optical transmittance of the upper or lower spectral portions of the each of optical transmittance valleys 521T, 523T, 525T, 531T, 533T, 535T, 541T, 543T, 545T, 551T, 553T and 555T. In some embodiments, the minimum optical transmittance each of optical transmittance valleys 521T, 523T, 525T, 531T, 533T, 535T, 541T, 543T, 545T, 551T, 553T and 555T can be from about 50% lower to about 80% lower, from about 50% lower to about 70% lower, or from about 50% lower to about 60% lower, as compared to a maximum optical transmittance of the upper or lower spectral portions of the each of optical transmittance valleys 521T, 523T, 525T, 531T, 533T, 535T, 541T, 543T, 545T, 551T, 553T and 555T, where the respective optical transmittance profiles 503T, 505T, 507T, and 509T can each be associated with VLT greater than about 55%, greater than about 70%, greater than about 75%, greater than about 80%, greater than about 85%, greater than about 90%, between about 55% and about 95%, between about 60% and about 92%, or between about 65% and about 90%.

Figure 5E:
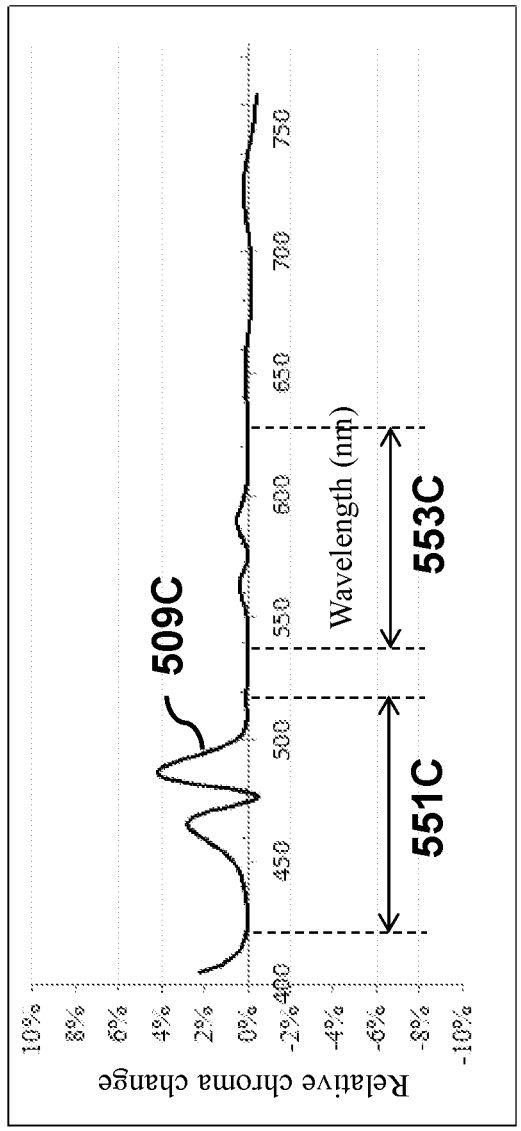

FIG. 5E illustrates a relative chroma change profile 509C associated with optical transmittance profile 509T and optical absorbance profile 509A, according to some embodiments. It would be understood that chroma change values exhibited in FIG. 5E are merely illustrative and not intended to be limiting, unless mentioned otherwise. As discussed above with reference to FIG. 3B, one or more absorbance peaks in optical absorbance profile 509A can be associated with a respective chroma enhancement window to alter a chroma value to improve vividness of a scene seen through eyewear 100. The chroma enhancement window can include portions of the visible spectral range in which high transmittance lens 400 and/or high transmittance lens 450 can provide a substantial change in chroma compared to a neutral lens having the same average attenuation within each 30 nm stimulus band, as perceived by a person with normal vision. In some embodiments, because, as previously discussed, transmittance enhancement layer 412 and/or anti-reflection layer 414 can increase an optical transmittance through high transmittance lens 400 or 450 across or over the visible spectral range in a wavelength-insensitive manner (e.g., transmittance enhancement layer 412 and/or anti-reflection layer 414 can uniformly increase optical transmittance for all wavelengths in the visible spectral range), optical absorbance profiles 503A, 505A, and 507A can each have a respective relative chroma change profile (not shown in FIG. 5E) substantially equal to one another and substantially identical to relative chroma change profile 509C. For example, each of absorbance peaks 521A (e.g., from absorbance profile 503A), 531A (e.g., from absorbance profile 505A), 541A (e.g., from absorbance profile 507A), and 551A (e.g., from absorbance profile 509A) can be associated with a chroma enhancement window 551C in relative chroma change profile 509C, where chroma enhancement window 551C can be in a spectral range of about 420 nm to about 520 nm, or about 450 nm to about 500 nm, or about 457 nm to about 497 nm. In some embodiments, each of absorbance peaks 521A, 531A, 541A, and 551A can be positioned in chroma enhancement window 551C. The average chroma value in chroma enhancement window 551C of relative chroma change profile 509C can be increased by greater than about 0.1%, greater than about 0.3%, greater than about 0.5%, greater than about 0.7%, greater than about 1%, greater than about 1.2%, greater than about 1.5%, greater than about 3%, greater than about 5%, greater than about 8%, greater than about 10%, greater than about 12%, or greater than about 15%, when comparing to the neutral filter.

Similarly, each of absorbance peaks 523A (e.g., from absorbance profile 503A), 533A (e.g., from absorbance profile 505A), 543A (e.g., from absorbance profile 507A), and 553A (e.g., from absorbance profile 509A) can be associated with a chroma enhancement window 553C in relative chroma change profile 509C, where chroma enhancement window 553C can be in a spectral range of about 530 nm to about 620 nm, or about 570 nm to about 585 nm, or about 572 nm to about 582 nm. In some embodiments, each of absorbance peaks 523A, 533A, 543A, and 553A can be positioned with a chroma enhancement window 553C. The average chroma value in chroma enhancement window 553C of relative chroma change profile 509C can be increased greater than about 0.1%, greater than about 0.2%, greater than about 0.3%, or greater than about 0.5%, for example, when comparing to the neutral filter.

In some embodiments, chroma change profile 509C (shown in FIG. 5E) can be substantially identical to chroma change profile 301C (shown in FIG. 3B). For example, in some embodiments, chroma enhancement windows 551C and 553C can be substantially equal to chroma enhancement windows 331C and 333C, respectively. In some embodiments, the above-noted discussions of average chroma value enhancements in chroma enhancement windows 551C and 553C can be substantially identical to those in chroma enhancement windows 331C and 333C, respectively.

Figure 6A:
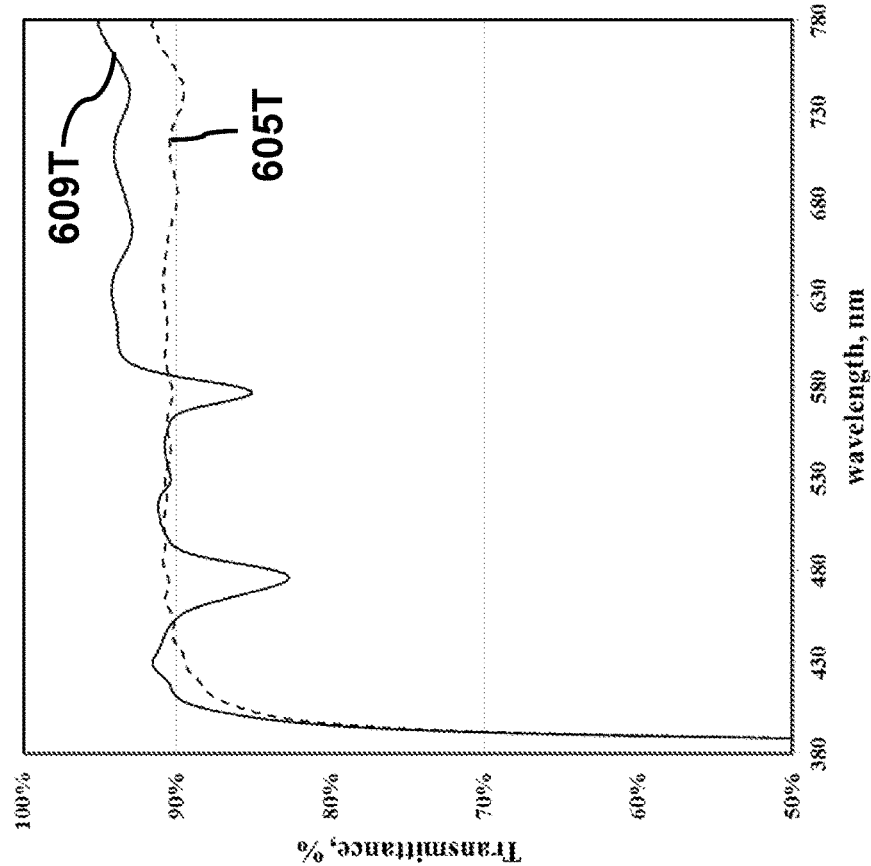
FIGS. 6A and 6B show optical characteristics of a neutral filter configured to provide a high optical transmittance for an eyewear and an optical filter configured to provide chroma enhancement and enhanced optical transmittance, for an eyewear, according to some embodiments.
Figure 6B:
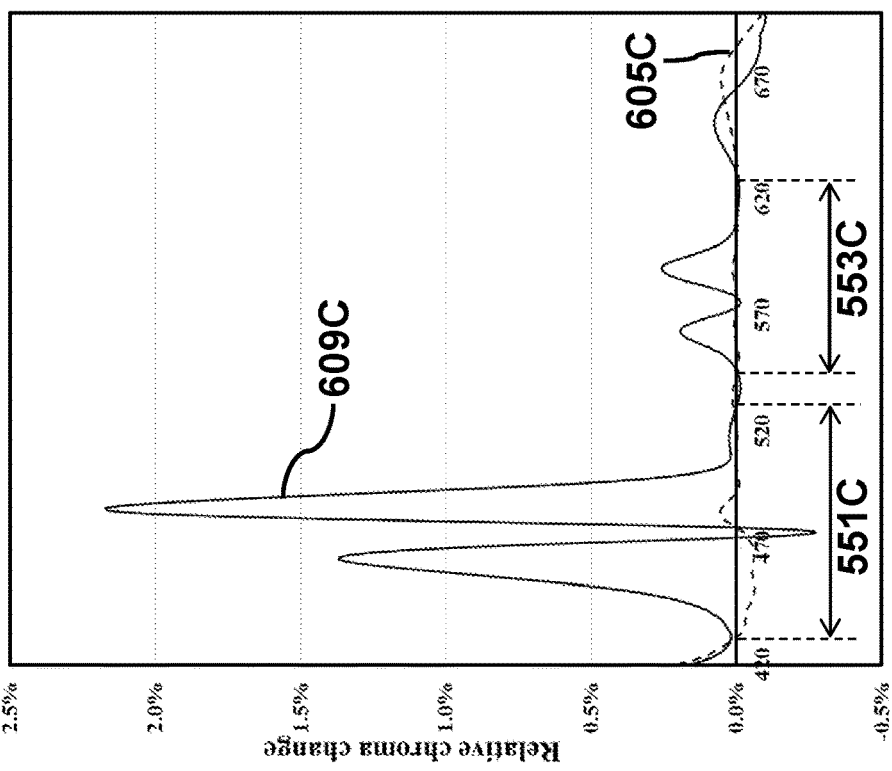

FIG. 6A illustrates optical transmittance profiles 605T and 609T, according to some embodiments. FIG. 6B illustrates relative chroma change profiles 605C and 609C associated with optical transmittance profile 605T and 609T, respectively, according to some embodiments. In some embodiments, optical transmittance profile 605T can represent a reference neutral filter (e.g., lens 450 but excluding transmittance enhancement layer 412 and anti-reflection layer 414) that has high transparency without chroma enhancement capability. In some embodiments, optical transmittance profile 609T can represent optical transmittance profile of a high transmittance lens with the addition of a chroma enhancement filter and a transmittance enhancement layer into the previously described neutral filter, resulting in the high transmittance lens that achieves a high optical transmittance while also achieving a useful chroma enhancement.

Referring to FIG. 6A, optical transmittance profile 605T can represent an optical transmittance of a lens like lens 450 but excluding transmittance enhancement layer 412 and anti-reflection layer 414. In some embodiments, optical transmittance profile 605T can represent an optical transmittance of a lens like lens 450 but excluding chroma enhancement layer 222. In some embodiments, optical transmittance profile 605T can represent an optical transmittance of a lens like lens 400 but that does not integrate chroma enhancement filters. Optical transmittance profile 605T can have a high optical transparency across the wavelength range between about 400 nm and about 780 nm. For example, optical transmittance profile 605T can have an optical transmittance greater than about 65% across the wavelength range between about 400 nm and about 780 nm. In some embodiments, optical transmittance profile 605T can have an optical transmittance greater than about 50%, greater than about 60%, or greater than about 70% across the wavelength range between about 400 nm and about 780 nm. In some embodiments, optical transmittance profile 605T can be associated with VLT greater than about 55%, greater than about 70%, greater than about 75%, greater than about 80%, greater than about 85%, or greater than about 90%. In some embodiments, optical transmittance profile 605T can be associated with VLT between about 55% and about 95%, between about 60% and about 92%, or between about 65% and about 90%.

Optical transmittance profile 609T can represent an optical transmittance of high transmittance lens 450 that at least includes (i) transmittance enhancement layer 412 and (iii) chroma enhancement layer 222 or high transmittance lens 400 with integrated chroma enhancement filters. In some embodiments, optical transmittance profile 609T can represent an optical transmittance of high transmittance lens 450 that can further include anti-reflection layer 414. As previously discussed, transmittance enhancement layer 412 and/or anti-reflection layer 414 can increase an optical transmittance through lens 400 across or over the visible spectral range in a wavelength-insensitive manner. As a result, optical transmittance profile 609T can have a similar optical transparency as optical transmittance profile 605T, even with a chroma enhancement incorporated into profile 609T. For example, each of optical transmittance profiles 605T and 609T can have an average optical transmittance (e.g., an integral of optical transmittance profile over the wavelength ranges between about 400 nm and 780 nm) substantially close to each other. In some embodiments, the average optical transmittances of optical transmittance profiles 605T and 609T can be substantially equal to each other. For example, a difference between the average optical transmittances of optical transmittance profiles 605T and 609T can be less than about 3%, less than about 2%, or less than about 1% in the wavelength ranges between about 400 nm and about 780 nm. In some embodiments, a difference between the average optical transmittances of optical transmittance profiles 605T and 609T can be less than about 20%, less than about 15%, less than about 10%, less than about 5%, or less than about 4% in the wavelength ranges between about 400 nm and about 780 nm. In some embodiments, the VLTs of optical transmittance profiles 605T and 609T can be substantially equal to each other. For example, a difference between the VLTs of optical transmittance profiles 605T and 609T can be less than about 3%, less than about 2%, or less than about 1%. In some embodiments, a difference between the VLTs of optical transmittance profiles 605T and 609T can be less than about 20%, less than about 15%, less than about 10%, less than about 5%, or less than about 4%. In some embodiments, optical transmittance profile 605T and 609T can each have an optical transmittance valley having a minimum optical transmittance substantially equal to each other in a spectral band between about 440 nm and about 520 nm, between about 450 nm and about 510 nm, between about 460 nm and about 500 nm, between about 540 nm and about 620 nm, between about 550 nm and about 600 nm, between about 570 nm and about 590 nm, between about 620 nm and about 700 nm, or between about 640 nm and about 680 nm. In some embodiments, optical transmittance profile 605T and 609T can each have a respective optical absorbance peak (not shown in FIG. 6A) having a maximum optical density substantially equal to each other in a spectral band between about 440 nm and about 520 nm, between about 450 nm and about 510 nm, between about 460 nm and about 500 nm, between about 540 nm and about 620 nm, between about 550 nm and about 600 nm, between about 570 nm and about 590 nm, between about 620 nm and about 700 nm, or between about 640 nm and about 680 nm.

As discussed above with reference to FIGS. 5A-5E, transmittance enhancement layer 412 and/or anti-reflection layer 414 can increase an optical transmittance through lens 400 across or over the visible spectral range without compromising or degrading the chroma enhancement capability of lens 400 or lens 450. On the other hand, transmittance enhancement layer 412 and/or anti-reflection layer 414 can also ensure a chroma enhancement lens exhibiting a high chroma enhancement without compromising or degrading the optical transmittance of lens 400 or lens 450. For example, as shown in FIG. 6B, the average chroma values provided by relative chroma change profile 609C in chroma enhancement windows 551C and 553C can be greater than those provided by relative chroma change profile 605C in chroma enhancement window 551C, where the optical transparency between the respective optical transmittance profiles 605T and 609T can be similar to each other as previously discussed at FIG. 6A.

Therefore, lenses 400 or 450, equipped with a chroma enhancement filter, transmittance enhancement layer 412, and anti-reflection layer 414, can provide a high average chroma value without degrading optical transparency.

The above-noted high optical transparency can provide high transmittance lenses 400 or 450 an extra design margin to incorporate functional layers (e.g., a polarizer, etc.) without violating a transparency requirement or visibility requirement of eyewear 100. In some embodiments, the average chroma value provided by relative chroma change profile 605C can be less than about 0.1% in chroma enhancement windows 551C and 553C, when comparing to a neutral lens. In some embodiments, the average chroma value provided by relative chroma change profile 609C can be greater than about 0.1%, greater than about 0.3%, greater than about 0.5%, greater than about 0.7%, greater than about 1%, greater than about 1.2%, greater than about 1.5%, greater than about 2%, greater than about 3%, or greater than about 4% in chroma enhancement window 551C, when comparing to the neutral lens. In some embodiments, the average chroma value provided by relative chroma change profile 609C can be greater than about 0.1%, greater than about 0.3%, or greater than about 0.5% in chroma enhancement window 553C, when comparing to the neutral lens.

Figure 7:
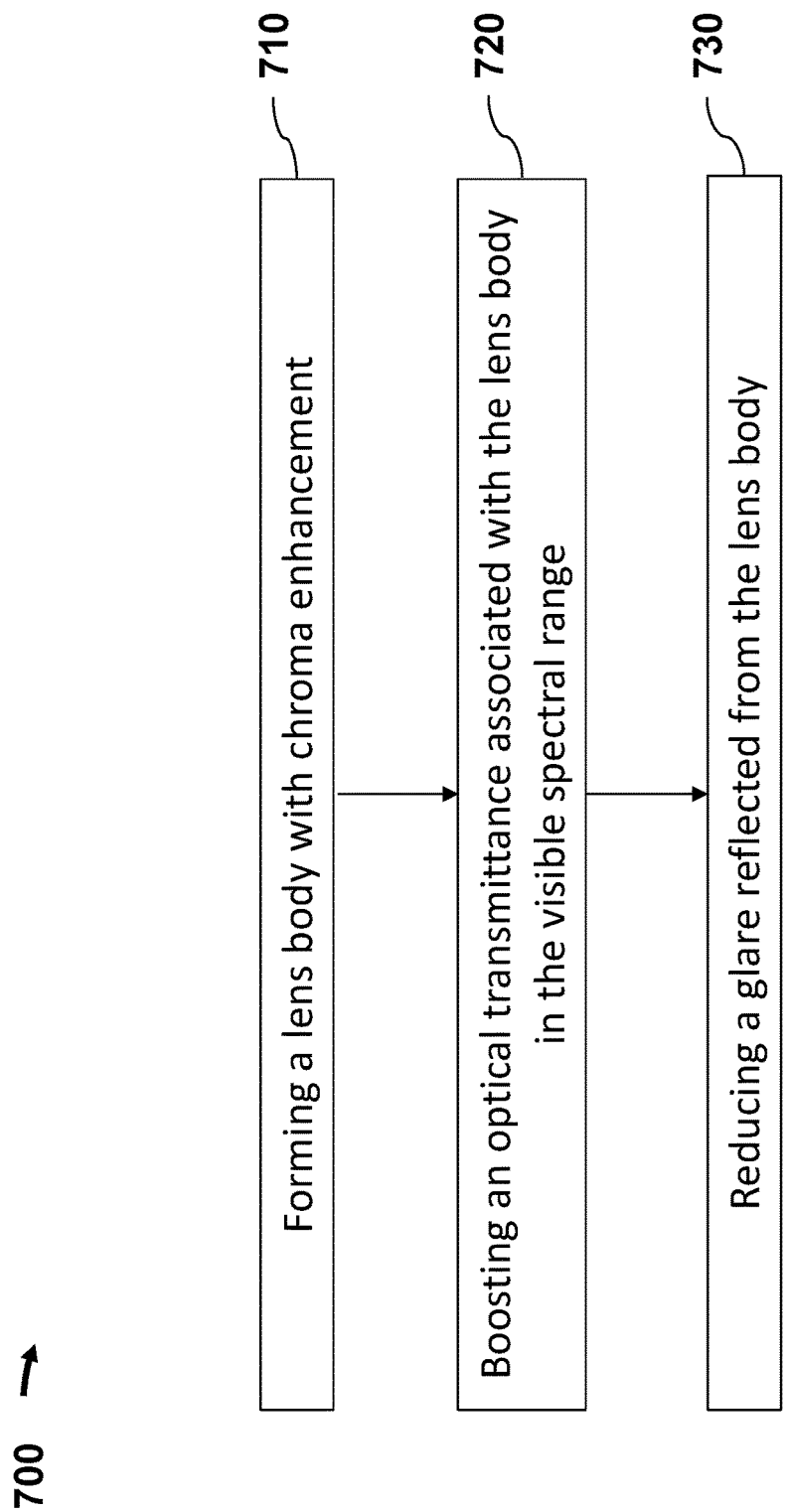
FIG. 7 is flow diagram of a method for generating an optical filter, configured to provide chroma enhancement, of an eyewear, according to some embodiments.

FIG. 7 is an exemplary method 700 for forming a high transmittance lens configured to provide chroma enhancement for an eyewear, according to some embodiments. This disclosure is not limited to this operational description. It is to be appreciated that additional operations may be performed. Moreover, not all operations may be needed to perform the disclosure provided herein. Further, some of the operations may be performed simultaneously, or in a different order than shown in FIG. 7. In some implementations, one or more other operations may be performed in addition to or in place of the presently described operations. For illustrative purposes, method 700 is described with reference to the embodiments described above, but method 700 is not limited to these embodiments.

Exemplary method 700 begins with operation 710, where a lens body with chroma enhancement is formed. In some embodiments, the process of forming the lens body can include providing an optically transparent material, and incorporating one or more chroma-enhancement materials with the optically transparent material. Namely, the optically transparent material can be blended with the chroma enhancement materials to form the lens body.

For example, one or more chroma enhancement dyes can be added to a molten resin before the resin is injected a mold cavity to form the lens body. By way of example and not limitation, the optically transparent material can include molten resin, polycarbonate (PC), allyl diglycol carbonate monomer (being sold under the brand name CR-39®), a resin layer (e.g., MR-8®), glass, nylon, polyurethane, polyethylene, polyureas, polyamide (PA), polyethylene terephthalate (PET), biaxially-oriented polyethylene terephthalate polyester film (BoPET, with one such polyester film sold under the brand name MYLAR®), acrylic (polymethyl methacrylate or PMMA), triacetate cellulose (TAC), a polymeric material, a co-polymer, a doped material, any other suitable material, or any combination thereof.

In some embodiments, the organic dye for the chroma enhancement material can include Exciton ABS 407 dye, Exciton ABS 473 dye, Exciton ABS 515 dye, Exciton ABS 574 dye, Exciton ABS 647 dye, or Exciton ABS 659 dye supplied by Exciton of Dayton, Ohio. Other organic dyes supplied by other vendors, such as Epolin Inc, Crysta-lyn, Adam Gates Company, HW Sands Corp, Yamada Chemical Co., and Gentex Corp, can be other embodiments of the organic dye for the chroma enhancement material. In some embodiments, the process of forming the lens body can include forming a lens substrate, and forming a chroma enhancement layer over the lens substrate. By way of example and not limitation, a forming process of the lens substrate can include applying injection molding process, a thermoforming process, a casting process, or a machining process on the optically transparent material described above.

By way of example and not limitation, the chroma enhancement materials can include or be included in a dielectric stack, multilayer interference coatings, rare earth oxide additives, an organic dye, or a combination therefore. By way of example and not limitation, the process of forming the chroma enhancement layer over the lens body can include placing the chroma enhancement material over one or more surfaces of the lens substrate using a deposition process, a coating process, an inkjet-printing process, an epitaxial process, a plating process, a material growth process (e.g., self-assembly growth), or a laminating process.

In some embodiments, the process of forming the lens body can include forming a chroma enhancement wafer, and forming a lens substrate over the chroma enhancement wafer. By way of example and not limitation, the process of forming chroma enhancement wafer can include injection molding or casting a wafer that includes one or more chroma enhancement materials. By way of example and not limitation, the process of forming the lens body over the chroma enhancement wafer can include placing the chroma enhancement wafer in a mold cavity and molding an optically transparent material, such as resin, over one or more surfaces of the chroma enhancement wafer in the mold cavity. As a result, after the optically transparent material (e.g., resin) is cooled down and hardened, the lens body can conform to the chroma enhancement wafer. It is noted that the above described embodiments for forming the lens body with chroma enhancement are exemplary and not limiting. Various implementations for forming the lens body are described, for example, in U.S. patent application Ser. No. 15/359,317, which is incorporated by reference herein and is made part of this disclosure.

Further, in operation 710, one or more functional layers can be formed over the lens body. By way of example and not limitation, each of the one or more functional layers can include a hard coat layer, an interference stack, a flash mirror, a photochromic layer, an electrochromic layer, an anti-static coating, a liquid containing layer, a trichoic filter, a glass layers, a hybrid glass-plastic layer, an index matching layers, or any combination of these. In some embodiments, the process of forming the one or more functional layers can include a laminating technique, a coating technique, a deposition technique, or any combination of these.

It would be understood that the above noted embodiments of operation 710 are merely illustrative and not limiting. Other examples of forming the lens body having chroma enhancement are disclosed in U.S. Pat. Pub. No. 2017/0075143, entitled "Eyewear and lenses with multiple molded lens components," filed Nov. 22, 2016, and U.S. Pat. Pub. No. 2017/0102558, entitled "Eyewear with multiple functional layers," filed Oct. 28, 2016, which are incorporated herein by reference.

In operation 720, an optical transmittance associated with the lens body is boosted in the visible spectral range. The boost of the optical transmittance can include matching the lens body's refractive index via an index-matching layer. For example, the matching of the lens body's refractive index can include forming a first interface of air/index-matching layer, and forming a second interface of index-matching layer/lens body, where the first interface can be positioned above the second interface. In response to the index-matching layer's refractive index being between air's refractive index (e.g., 1.0) and the lens body's refractive index, a total optical transmittance through the lens body can be boosted in the visible spectral range. In some embodiments, the index-matching layer can be formed (e.g. spin-coating/depositing) over the lens body's front surface. In some embodiments, the index-matching layer can be formed over the chroma enhancement layer and/or the one or more functional layers formed over the lens body. In some embodiments, the index-matching layer can have a refractive index smaller than any of the lens body and/or the chroma enhancement layer.

In operation 730, an optical reflectivity from the lens body is reduced. The reduction of the optical reflectivity can include forming an anti-reflection layer over the lens body's back surface. In some embodiments, in response to the anti-reflection layer's refractive index being between air's refractive index (e.g., 1.0) and the lens body's refractive index, an optical reflectivity from the lens body's back surface can be reduced.

The embodiments described above are directed to a high transmittance eyewear with both chroma enhancement and high optical transparency, and a method for forming the same. The high transmittance eyewear can be configured to provide chroma enhancement across or over visible spectral bands while further providing a high optical transmittance across or over the visible spectral range. In some embodiments, the high transmittance eyewear can include a lens having a lens body and a chroma enhancement filter integrated with the lens body. In some embodiments, the chroma enhancement filter can be configured to provide the chroma enhancement. The lens can further include an index-matching layer formed over the lens body's front surface, and configured to boost an optical transmittance through the lens body across or over the visible spectral range. By equipping the lens with the index-matching layer, the high transmittance eyewear can provide a clear view with an increase chroma (e.g, enhance vividness seen through the high transmittance eyewear). In some embodiments, the lens can further include an anti-reflection layer formed over the lens body's back surface and configured to reduce an optical reflectivity from the lens body's back surface. A benefit of the high transmittance eyewear is to concurrently provide both a vivid (e.g., high chroma enhancement) and clear view (e.g., a high optical transparency) for an indoor or a driving situation. In addition, the characteristic of the boosted optical transmittance of the high transmittance eyewear can allow the high transmittance eyewear to further include other functional layers (e.g., polarizer, anti-fog, etc.) without compromising the requirement of high transmittance eyewear's visibility.

In some embodiments, a high transmittance eyewear comprises a lens comprising an optical filter and an index-matching layer disposed over a front surface of the optical filter, wherein an E313 yellowness index of the high transmittance lens is less than about 23, a refractive index of the index-matching layer is between a refractive index of the optical filter and a refractive index of a working environment (e.g., air) of the eyewear, and a spectral transmittance of the optical filter comprises a first associated absorbance peak in a first spectral range of about 440 nm to about 520 nm, wherein a maximum absorbance of the first associated absorbance peak has an optical density between about 0.05 and about 0.3. In some embodiments, the high transmittance lens has a colorless or color-neutral appearance.

In some embodiments, an eyewear includes a high transmittance lens comprising a lens, an index-matching layer disposed over a front surface of the lens, and an anti-reflection layer disposed over a back surface of the lens, wherein the lens comprises a lens body, a chroma enhancement layer coupled to the lens body, and a first transition layer disposed over the chroma enhancement layer, wherein a yellowness index of the high transmittance lens is less than about 23; a refractive index of the index-matching layer is smaller than a refractive index of the lens body; a reflectivity at an exposed surface of the anti-reflection layer is between about 0% and 10% in a spectral range of about 400 nm to about 750 nm; the chroma enhancement layer is configured to increase an average chroma value of uniform intensity light stimuli having a bandwidth of 30 nm transmitted through the chroma enhancement layer at least partially within one or more filtered portions of the visible spectral by attenuating a portion of the light transmitted by the chroma enhancement layer in the one or more filtered portions of the visible spectrum, the chroma value being the C* attribute of the CIE L*C*h* color space; and a spectral transmittance of the chroma enhancement layer comprises a first absorbance peak in a first spectral range of about 440 nm to about 520 nm, wherein a maximum absorbance of the first absorbance peak has an optical density between about 0.05 and about 0.3. In some embodiments, the high transmittance lens has a colorless or color-neutral appearance.

In some embodiments, an eyewear includes a high transmittance lens comprising a lens having a spectral transmittance, wherein the high transmittance lens has a CIE color space attributes L*, a*, and, b*, wherein a square root of a sum of a* and b* is less than about 15; the lens comprises a lens body having a first surface and a second surface opposite to the first surface, a chroma enhancement layer disposed over the first surface of the lens body, an index-matching layer disposed over the chroma enhancement layer, and an anti-reflection layer disposed over the second surface of the lens body; and the spectral transmittance of the optical filter is between about 60% and about 100% in a spectral range of about 400 nm to about 750 nm, wherein the spectral transmittance of the lens comprises: a first absorbance peak in a spectral range of about 440 nm to about 520 nm, wherein a maximum absorbance of the first absorbance peak has an optical density between about 0.05 and about 0.3; and a second absorbance peak in a spectral range of about 550 nm to about 600 nm, wherein a maximum absorbance of the second absorbance peak has an optical density between about 0.05 and about 0.3.

The foregoing disclosure outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A high transmittance eyewear, comprising:
   a lens comprising a chroma enhancement filter, the lens having a front surface and a rear surface, wherein the chroma enhancement filter comprises a chroma enhancement dye; and
   a transmittance enhancement layer disposed over the front surface of the lens,
   wherein:
   an average chroma value of uniform intensity light transmitted through the high transmittance eyewear is increased as compared to a neutral lens the neutral lens being a lens with a transmittance profile across a spectral range of 430 nm to 780 nm being constant within 5% of an average transmittance of the neutral lens, the chroma value being the C* attribute of the CIE L*C*h* color space,
   the high transmittance eyewear attenuates a portion of the light in a first spectral range of 440 nm to 520 nm,
   a transmittance profile associated with the high transmittance eyewear comprises a first transmittance valley in the first spectral range, a minimum transmittance of the first transmittance valley has a first transmittance;
   a transmittance profile associated with the lens comprises a second transmittance valley in the first spectral range, wherein a minimum transmittance of the second transmittance valley has a second transmittance less than the first transmittance;
a difference in transmittance between the transmittance profile associated with the high transmittance eyewear and the transmittance profile associated with the lens is between about 0.1% to about 15% for each wavelength across a spectral range between about 400 nm and about 700 nm;
a difference in an average optical transmittance of the high transmittance eyewear and an average optical transmittance of the neutral lens is less than 3% in a spectral range between 400 nm and 780 nm, and
an optical transmittance of the high transmittance eyewear is greater than 65% for each wavelength across a spectral range between 400 nm and 780 nm.

2. The high transmittance eyewear of claim 1, wherein: a spectral absorbance profile associated with the high transmittance eyewear comprises a first absorbance peak in the first spectral range;
a maximum absorbance of the first absorbance peak has a first optical density; and
the first optical density is from 0.05 to 0.3.

3. The high transmittance eyewear of claim 1, wherein the transmittance enhancement layer comprises an index-matching layer.

4. The high transmittance eyewear of claim 1, wherein the transmittance enhancement layer comprises an anti-reflection layer.

5. The high transmittance eyewear of claim 1, wherein the lens comprises a lens body, and the chroma enhancement filter comprises the chroma enhancement dye integrated into the lens body.

6. The high transmittance eyewear of claim 1, wherein the lens comprises a lens body, and the chroma enhancement filter is separated from the lens body.

7. The high transmittance eyewear of claim 6, wherein the chroma enhancement filter is an optical layer disposed between the transmittance enhancement layer and the lens body.

8. The high transmittance eyewear of claim 6, wherein the chroma enhancement filter is an optical layer disposed between the lens body and the rear surface of the lens.

9. The high transmittance eyewear of claim 1, further comprising an anti-reflection layer disposed over the rear surface of the lens, wherein an optical reflectivity at an exposed surface of the anti-reflection layer is less than 10% for each wavelength across the spectral range of 400 nm to 780 nm.

10. The high transmittance eyewear of claim 1, further comprising:
a first hard coat layer disposed between the transmittance enhancement layer and the front surface of the lens; and
a second hard coat layer disposed over the rear surface of the lens.

11. The high transmittance eyewear of claim 1, wherein the transmittance enhancement layer comprises magnesium fluoride.

12. The high transmittance eyewear of claim 1, wherein the transmittance enhancement layer comprises a multilayer index coating.

13. The high transmittance eyewear of claim 1, wherein the high transmittance eyewear comprises a color neutral appearance with an L* attribute, an a* attribute, and a b* attribute in the CIE L*a*b* color space, wherein the square root of the sum of the square of a* and b* is less than 15.

14. The high transmittance eyewear of claim 1, wherein a yellowness index of the high transmittance eyewear is less than 23.

15. The high transmittance eyewear of claim 1, wherein the high transmittance eyewear further attenuates a portion of light transmitted through the high transmittance eyewear in a second spectral range of 540 nm to 620 nm, wherein a maximum absorbance of an absorbance peak in the second spectral range has an optical density between 0.05 and 0.3.

16. The high transmittance eyewear of claim 1, wherein the high transmittance eyewear further attenuates a portion of light transmitted through the high transmittance eyewear in a second spectral range of 620 nm to 700 nm, wherein a maximum absorbance of an absorbance peak in the second spectral range has an optical density between 0.01 and 0.15.

17. The high transmittance eyewear of claim 1, wherein a visible light transmittance (VLT) of the high transmittance eyewear is greater than 80%.

18. The high transmittance eyewear of claim 1, wherein another chroma value of uniform intensity light transmitted through the lens is increased as compared to a neutral lens that uniformly transmits a same average percentage of light across the visible spectrum as the lens, by attenuating a portion of the light transmitted through the lens in the first spectral range of 440 nm to 520 nm, the chroma value being the C* attribute of the CIE L*C*h* color space, and wherein the average chroma value associated with the high transmittance eyewear is substantially equal to the other average chroma value associated with the lens.

19. The high transmittance eyewear of claim 1, wherein the optical transmittance of the high transmittance eyewear is greater than 70% for each wavelength across the spectral range between 400 nm and 780 nm.

* * * * *